United States Patent
Busayarat et al.

(10) Patent No.: US 10,412,187 B2
(45) Date of Patent: Sep. 10, 2019

(54) BATCHING DATA REQUESTS AND RESPONSES

(71) Applicant: Home Box Office, Inc., New York, NY (US)

(72) Inventors: Sata Busayarat, Seattle, WA (US); Brandon C. Furtwangler, Issaquah, WA (US); Steven N. Furtwangler, Okemos, MI (US)

(73) Assignee: HOME BOX OFFICE, INC., New York, NY (US)

(*) Notice: Subject to any disclaimer, the term of this patent is extended or adjusted under 35 U.S.C. 154(b) by 272 days.

(21) Appl. No.: 15/291,810

(22) Filed: Oct. 12, 2016

(65) Prior Publication Data
US 2017/0104838 A1    Apr. 13, 2017

Related U.S. Application Data

(60) Provisional application No. 62/240,888, filed on Oct. 13, 2015.

(51) Int. Cl.
*H04L 29/08* (2006.01)
*G06F 16/951* (2019.01)
(Continued)

(52) U.S. Cl.
CPC ........ *H04L 67/2842* (2013.01); *G06F 16/951* (2019.01); *G06T 1/20* (2013.01);
(Continued)

(58) Field of Classification Search
CPC .......... G06F 17/30864; H04L 67/2842; H04N 21/251; H04N 21/43
See application file for complete search history.

(56) References Cited

U.S. PATENT DOCUMENTS 6,025,837 A    2/2000    Matthews, III et al.
7,302,430 B1    11/2007    Nagda et al.
(Continued)

FOREIGN PATENT DOCUMENTS

EP    0848554 A2    6/1998
WO    9713368 A1    4/1997
(Continued)

OTHER PUBLICATIONS

Office Action for U.S. Appl. No. 15/285,439 dated Jul. 27, 2017, 27 pages.

(Continued)

*Primary Examiner* — Joe Chacko
(74) *Attorney, Agent, or Firm* — Amin, Turocy & Watson, LLP

(57) ABSTRACT

The described technology is generally directed towards batching two or more data requests into a batch request that is sent to a data-providing entity such as a client data access layer coupled to a data service. Described is maintaining a mapping of the requests to requesting entities so that the responses to a batched request, which may be separately streamed, may be assembled into a batch response to the requesting entity. Also described is multiplexing a plurality of requests for the same data item into a single request, which may be added to a batch request, and de-multiplexing the single response into separate responses to each requesting entity.

20 Claims, 18 Drawing Sheets

(51) Int. Cl.

| | | |
|---|---|---|
| G06T 1/20 | (2006.01) | |
| G06T 11/20 | (2006.01) | |
| H04L 29/06 | (2006.01) | |
| G06T 1/60 | (2006.01) | |
| H04L 12/24 | (2006.01) | |
| H04L 12/26 | (2006.01) | |
| H04N 21/25 | (2011.01) | |
| H04N 21/433 | (2011.01) | |
| H04N 21/482 | (2011.01) | |
| H04N 21/43 | (2011.01) | |

(52) U.S. Cl.
CPC ............. *G06T 1/60* (2013.01); *G06T 11/206* (2013.01); *H04L 41/5038* (2013.01); *H04L 41/5054* (2013.01); *H04L 43/045* (2013.01); *H04L 43/10* (2013.01); *H04L 65/105* (2013.01); *H04L 67/02* (2013.01); *H04L 67/10* (2013.01); *H04L 67/16* (2013.01); *H04L 67/28* (2013.01); *H04L 67/2833* (2013.01); *H04L 67/2852* (2013.01); *H04L 67/32* (2013.01); *H04L 67/34* (2013.01); *H04L 67/42* (2013.01); *H04N 21/251* (2013.01); *H04N 21/43* (2013.01); *H04N 21/4332* (2013.01); *H04N 21/4821* (2013.01); *H04N 21/4826* (2013.01)

(56) References Cited

U.S. PATENT DOCUMENTS

| | | | |
|---|---|---|---|
| 7,373,459 | B2 * | 5/2008 | Aoki ............... H04L 47/10 709/203 |
| 7,620,653 | B1 | 11/2009 | Swartz |
| 7,793,206 | B2 | 9/2010 | Lim et al. |
| 8,725,849 | B1 | 5/2014 | Lloyd |
| 8,849,825 | B1 | 9/2014 | McHugh et al. |
| 9,031,995 | B1 | 5/2015 | Raden, II et al. |
| 9,166,862 | B1 * | 10/2015 | Davis ............... H04L 29/06047 |
| 9,419,852 | B1 | 8/2016 | Heller et al. |
| 9,817,646 | B1 | 11/2017 | Chen et al. |
| 9,875,262 | B2 | 1/2018 | McHugh et al. |
| 9,887,885 | B2 | 2/2018 | Varney et al. |
| 9,891,938 | B2 | 2/2018 | Barry et al. |
| 9,894,119 | B2 | 2/2018 | Pearl et al. |
| 10,042,626 | B2 | 8/2018 | Nekrestyanov et al. |
| 10,148,762 | B2 | 12/2018 | Rogers et al. |
| 10,320,879 | B2 | 6/2019 | Nekrestyanov et al. |
| 2001/0034771 | A1 | 10/2001 | Hutsch et al. |
| 2002/0143591 | A1 | 10/2002 | Connelly |
| 2003/0037206 | A1 | 2/2003 | Benfield et al. |
| 2003/0038836 | A1 | 2/2003 | Ronald et al. |
| 2003/0039230 | A1 * | 2/2003 | Ostman ............... H04W 28/18 370/335 |
| 2003/0097357 | A1 | 5/2003 | Ferrari et al. |
| 2004/0082352 | A1 | 4/2004 | Keating et al. |
| 2004/0098744 | A1 | 5/2004 | Gutta |
| 2004/0139480 | A1 | 7/2004 | Delpuch et al. |
| 2005/0289168 | A1 | 12/2005 | Green et al. |
| 2006/0236221 | A1 | 10/2006 | McCausland et al. |
| 2009/0125809 | A1 | 5/2009 | Trapani et al. |
| 2009/0138441 | A1 * | 5/2009 | Valentine .......... G06F 17/30864 |
| 2009/0193044 | A1 | 7/2009 | Buehrer et al. |
| 2010/0063878 | A1 * | 3/2010 | Bachet ............. G06Q 30/0251 705/14.49 |
| 2010/0257204 | A1 | 10/2010 | Orlov et al. |
| 2011/0246471 | A1 | 10/2011 | Rakib |
| 2011/0289458 | A1 | 11/2011 | Yu et al. |
| 2011/0289533 | A1 | 11/2011 | White et al. |
| 2013/0024851 | A1 | 1/2013 | Firman et al. |
| 2013/0031204 | A1 | 1/2013 | Graham et al. |
| 2013/0046849 | A1 | 2/2013 | Wolf et al. |
| 2013/0346539 | A1 * | 12/2013 | Sivasubramanian ....................... H04L 67/2842 709/213 |
| 2014/0006951 | A1 | 1/2014 | Hunter |
| 2014/0040301 | A1 | 2/2014 | Chadha et al. |
| 2014/0047073 | A1 | 2/2014 | Beme |
| 2014/0181137 | A1 * | 6/2014 | Stein ................... G06F 17/3064 707/769 |
| 2014/0223303 | A1 | 8/2014 | Cox et al. |
| 2015/0051749 | A1 | 2/2015 | Hancock et al. |
| 2016/0105710 | A1 | 4/2016 | Watson et al. |
| 2016/0140002 | A1 | 5/2016 | Fee et al. |
| 2016/0337426 | A1 | 11/2016 | Shribman et al. |
| 2017/0006036 | A1 | 1/2017 | Bellingham |
| 2017/0032005 | A1 | 2/2017 | Zheng et al. |
| 2017/0041296 | A1 | 2/2017 | Ford et al. |
| 2017/0103553 | A1 | 4/2017 | Busayarat et al. |
| 2017/0105049 | A1 | 4/2017 | Busayarat et al. |
| 2018/0060248 | A1 * | 3/2018 | Liu ..................... G06F 12/1408 |
| 2018/0131633 | A1 | 5/2018 | Li |

FOREIGN PATENT DOCUMENTS

| | | |
|---|---|---|
| WO | 2007054687 A1 | 5/2007 |
| WO | 2011102824 A2 | 8/2011 |

OTHER PUBLICATIONS

El-Ansary, et al., "An Overview of Structured P2P Overlay Networks," In: Handbook on Theoretical and Algorithmic Aspects of Sensor, Ad Hoc Wireless, and Peer-to-Peer Networks 1 led] Jie Wu, Auerbach Publications, 2006, 27 pages.

Non-Final Office Action received for U.S. Appl. No. 15/291,247 dated Jun. 14, 2018, 43 pages.

Non-Final Office Action received for U.S. Appl. No. 15/290,722 dated Jun. 28, 2018, 29 pages.

First Office Action received for Colombian Application Serial No. NC2018/0005094 dated May 22, 2018, 3 pages (with English translation).

Non-Final Office Action received for U.S. Appl. No. 15/285,439 dated Jul. 25, 2018, 32 pages.

Chinese Office Action received for Chinese Patent Application Serial No. 201690001472.1 dated Aug. 17, 2018, 2 pages.

Notice of Allowance for U.S. Appl. No. 15/252,166 dated Mar. 22, 2018, 40 pages.

Office Action for U.S. Appl. No. 15/285,439 dated Feb. 2, 2018, 23 pages.

International Search Report and Written Opinion for PCT Application Serial No. PCT/US2016/056755 dated Dec. 19, 2016, 15 pages.

European Office Action for European Application Serial No. 16787677.0 dated May 30, 2018, 3 pages.

Final Office Action received for U.S. Appl. No. 15/285,439 dated Jan. 30, 2019, 41 pages.

International Search Report and Written Opinion received for International Application Serial No. PCT/US2018/030717 dated Aug. 7, 2018, 16 pages.

Final Office Action received for U.S. Appl. No. 15/290,722 dated Feb. 25, 2019, 33 pages.

Communication pursuant to Article 94(3) EPC received for EP Patent Application Serial No. 16787677.0 dated Mar. 13, 2019, 8 pages.

Non-Final Office Action received for U.S. Appl. No. 15/584,142 dated Apr. 29, 2019, 144 pages.

Non-Final Office Action received for U.S. Appl. No. 15/449,229 dated Jun. 28, 2019, 52 pages.

* cited by examiner

BATCHING DATA REQUESTS AND RESPONSES

CROSS-REFERENCE TO RELATED APPLICATION

The present application claims priority to U.S. provisional patent application Ser. No. 62/240,888, filed Oct. 13, 2015.

BACKGROUND

Client users interact with information via user interfaces, such as objects represented as menus of buttons, tiles, icons and/or text, for example, by which a client user may make a desired selection. For example, a client user may view a scrollable menu containing objects representing video content of a data service, such as movies or television shows, and interact with the menu items to select a movie or television show for viewing.

A lot of information from the data service may be cached at a client device, which provides for rapid and efficient user interaction. Caching has its limitations, however, including that cache misses often occur, and that cached data are associated with an expiration (e.g., timestamp or time-to-live, or TTL) value, and thus expire. Thus, additional data and/or more current data often need to be obtained from the data service.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards batching requests from requesting entities (e.g., client objects) to a data-providing entity (e.g., a data service), and assembling the one or more responses to the batch request into a response, which may be a batch response, to each requesting entity. A request handling entity receives requests for data from requesting entities, in which at least some of the requests for the data each identify one or more data items via a corresponding data identifier for each data item. A request manager of the request handling entity includes a request batcher that that adds identifiers of requested data items to a batch buffer, and sends the batch buffer to a data-providing entity. A response handling component returns responses to the requesting entities, with each response containing response information for each data item that is identified via an identifier in a corresponding request.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
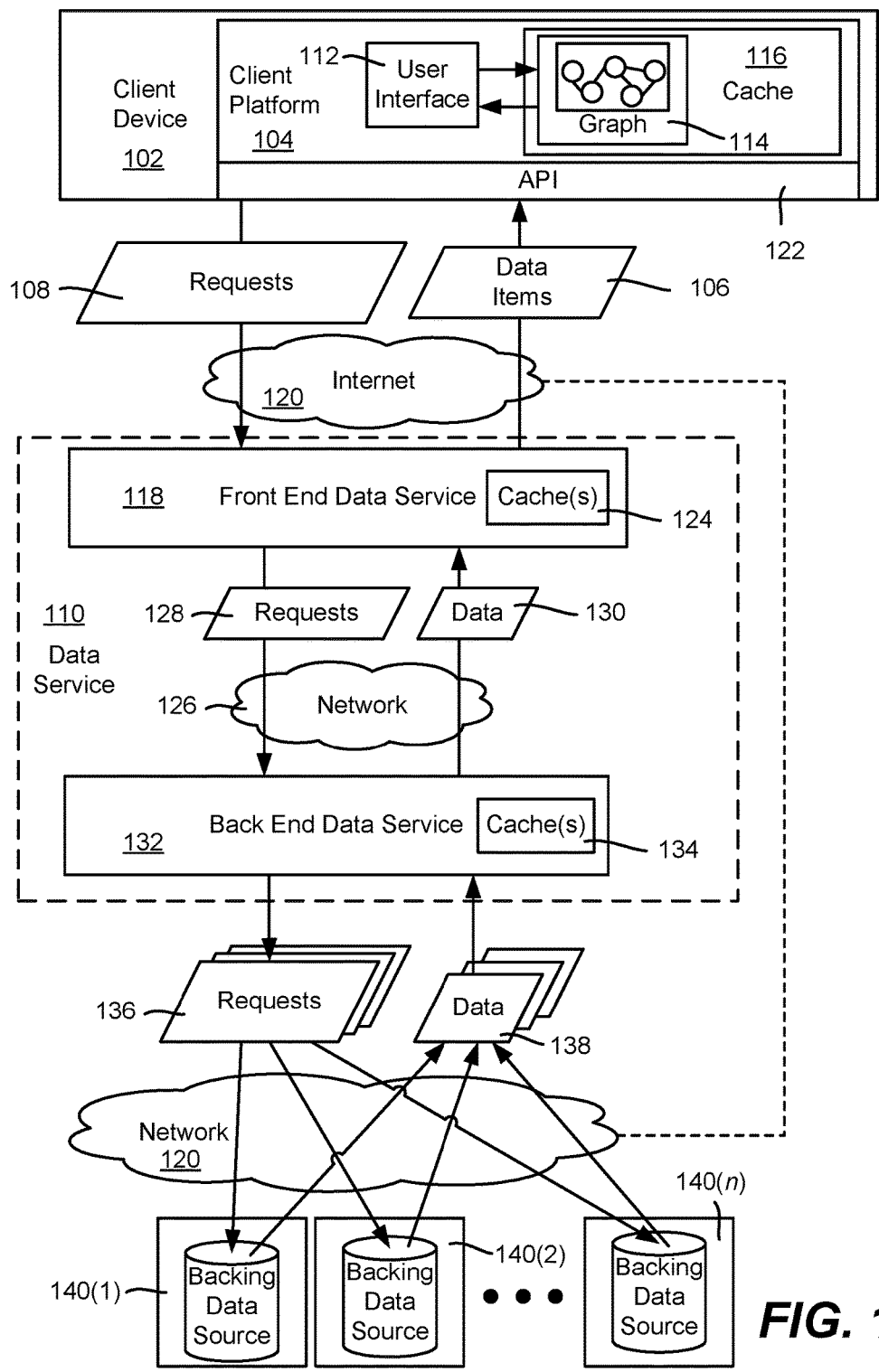
FIG. 1 is an example block diagram representation of a client device communicating with a data service to obtain data corresponding to a graph with which a client user may interact, according to one or more example implementations.

Various aspects of the technology described herein are generally directed towards batching requests to a data service, when possible, to increase client-data service communication efficiency. In addition to batching requests, a client device may multiplex requests, which refers to sending only one request for a data item when at least one other request for that same data item is already pending.

In one or more implementations, batch response handling needs to be performed at the data service level and/or the client device level. For example, a data service may be configured to respond to a client batch request as a batched response. If returning a batch response to a client device's batch request, the data service may need to assemble cached data and/or a stream of separate responses (e.g., partial responses comprising individual responses and/or partial batch responses) from its various data sources into the batch response. If instead the data service returns a stream of separate responses to the client device (e.g., individual responses and/or partial batch responses), the client device needs to assemble those responses into a batch response to a client requestor (e.g., a client user interface object) that is expecting a batch response.

As another example, if a client device sends out a single multiplexed request to obtain the same data item for two or more client requestors (e.g., client user interface objects), the single response that is returned for that single request needs to be "de-multiplexed" at the client device into separate responses to return to each client requestor. At least one of these separate de-multiplexed responses may be part of a response to a batch request, and thus following de-multiplexing at the client device, the client device may need to assemble the de-multiplexed response into part of at least one batch response for returning to each client requestor. Still further, a data service may multiplex requests for the same data received from multiple clients, e.g., from a data service front-end to a data service back-end, and/or from the data service to one or more backing data stores.

Note that it is feasible for a client requestor to remap responses to the separate requests that made up a batch request. However in one or more implementations, a general approach is to let client requestors make get or batch requests for data and receive corresponding responses in a straightforward way, without client requestors having any particular knowledge of the underlying mechanisms that perform data retrieval and processing, such as those that perform batching of requests and/or assembly of separate responses into a batched response.

As will be understood, the technology described herein operates by tracking client requestors along with their requests for data items, and using the tracking to map responses back to the client requests. As will be understood, such tracking and mapping operations for batching and/or multiplexing related operations may occur at the client device level, or the data service level or both.

It should be understood that any of the examples herein are non-limiting. For instance, some of the examples refer to data related to client selection of video content (including audio) from a streaming service that delivers movies, television shows, documentaries and the like. However, the technology described herein is independent of any particular type of data, and is also independent of any particular user interface that presents the data as visible representations of objects or the like. Thus, any of the embodiments, aspects, concepts, structures, functionalities or examples described herein are non-limiting, and the technology may be used in various ways that provide benefits and advantages in data communication and data processing in general.

One or more implementations herein are exemplified in which the data underlying a client user interface comprise data items arranged as a graph of nodes and edges. In general, a graph is built by each client, in which each graph node (sometimes referred to herein as a "provider node" in the client device) represents a part of the underlying data that is available via a data service; (as used herein a "graph" is formed by the relationships between provider nodes or provider node data structures, regardless of whether visibly represented as nodes and edges).

To build the client graph, in addition to the data properties/attributes maintained in a provider node, a provider node's data also may include edge references to other provider nodes, as well as possibly more specific relationship information, e.g., indicative of a child or parent relationship to another provider node. The client platform software follows these references to obtain more provider nodes from the data service as needed. For example, if a provider node A, such as representing a menu, references two child provider nodes B and C, then when provider node A is to be rendered as a user interface menu object, the data is obtained for provider nodes B and C so that they can be rendered as UI objects that are part of the A menu, and so on. If a client interacts to select item B, e.g., a sub-menu object of menu A, then the provider node data for sub-menu B including B's referenced provider nodes are requested and obtained so that menu object B and its referenced provider node objects can be rendered. Note that one or more provider nodes may be returned from the data service in anticipation of their likely being needed rather than waiting for an actual need. Further, once obtained, provider nodes may be cached at the client so that they may be quickly accessed from the client cache rather than obtained via another (e.g., internet) request to the data service.

In general, data items as described herein, including provider nodes, have an identifier (ID) that is unique to the data service, and indeed may be globally unique. One or more implementations use a Uniform Resource Name (URN); (e.g., urn:hbo:menu:root) as the identifier. Provider nodes are typed; (note that in one scheme, the type of provider node also may be determined from its URN) each provider node implements a model with a model interface that defines the schema/shape of the provider node's data. For example, with respect to video content, there may be a provider node of type "feature" that represents some streaming video content and includes a title, a URL to an image, a rating (if known), and so forth. As another example, a provider node of type "user" may represent a client user, and may have per-user data such as a username, parental controls (such as maximum rating allowed), a "watch-list" of user-specified (and/or for example machine-learned favorite) shows of particular interest or the like, and so forth. Via the user provider node, each different client user can have a per-user customized graph portion.

Thus, based upon user interaction as well as automated processes, using the graph of provider node relationships, a client software platform makes requests to a data service for one or more provider nodes to obtain their data as needed. The client requests may be to a request handling portion of a data service, e.g., a client interfacing front-end data service coupled to the client via the internet. The front-end data service interprets each request and responds with the requested data, which in one or more implementations may be obtained from a front-end cache, or via a back-end data service, including from a back-end cache and/or backing data sources. In this way the client software builds relevant portion(s) of the client graph as needed, which in general is highly efficient with respect to resource usage and obtaining rapid responses. Note that provider nodes may be cached at the client as described herein, and thus when data is needed the client platform may first attempt to use client-cached data without making a request to the request handling portion of the data service.

FIG. 1 is a block diagram representing example components that may be used to handle client requests for data items, which for example may be graph nodes of a client graph. As exemplified in FIG. 1, a client device 102 runs client platform software 104 that receives data items 106, including via requests 108, from a data service 110. In this way, the client platform 104 may present visible representation of objects on a user interface 112, by rendering menus comprising buttons, icons, tiles and so forth by which a user can navigate to other locations and/or make a selection. Note the in one or more implementations, the user interface objects are configured to render visible representations of themselves as well as make requests for any needed data, including for data corresponding to their child objects, and so on.

In one or more implementations, the client software program's UI elements or the like that may make requests for data to the client platform (e.g., at a data service level) without needing to know about how the underlying data is maintained, organized, retrieved and so forth. For example, a tile object that represents a television show may in a straightforward manner send a request to the client platform software for a title corresponding to a title ID and gets the title back. As will be understood, beneath the UI level, the client platform software may obtain the title from a data item comprising a (feature type) data node (sometimes referred to as a provider node at the client device) corresponding to that ID. Such data may be obtained from a client cache that contains the data items comprising the graph nodes, but if not cached, by requesting the node from a data service, as described herein.

As set forth above, in an example graph-based implementation, each provider node may reference one or more other provider nodes, which forms a graph 114 (e.g., generally maintained in a client cache 116 or other suitable data storage). The client graph 114 is built by obtaining the data for these other provider nodes as needed, such as when provider nodes (or sub-parts thereof) are rendered as visible representations of objects on the interactive user interface 112. Example visible representations of provider node data may include menus, tiles, icons, buttons, text and so forth.

In general, the client graph 114 comprises a client-relevant subset of the overall data available from the data service 110; (the available data at the data service can be considered an overall virtual graph). To obtain the data items (e.g., uniquely identified provider nodes) 106, the client platform 104 interfaces with the data service 110, e.g., via a client interfacing front-end data service 118, over a network such as the internet 120. An application programming interface (API) 122 may be present that may be customized for devices and/or platform software versions to allow various types of client devices and/or various software platform versions to communicate with the front-end data service 118 via a protocol that both entities understand.

The front-end data service 118 may comprise a number of load-balanced physical and/or virtual servers (not separately shown) that return the requested provider nodes 106, in a manner that is expected by the client platform software 104. Some of the requests for a provider node may correspond to multiple sub-requests that the client platform software 104 expects in a single provider node; for example, a request for a tile provider node that represents a feature (movie) may correspond to sub-requests for a title (in text), an image reference such as a URL, a rating, a plot summary and so on. A request for a user's "watch list" may correspond to sub-requests for multiple tiles. The data service 110 understands based upon each provider node's type how to obtain and assemble data sub-parts as needed, from possibly various sources, into a single provider node to respond to a client request for a provider node.

The corresponding provider node may be contained in one or more front-end caches 124, which allows like requests from multiple clients to be efficiently satisfied. For example, each load-balanced server may have an in-memory cache that contains frequently or recently requested data, and/or there may be one or more front-end caches shared by the front-end servers. The data is typically cached as a full provider node (e.g., a tile corresponding to data from multiple sub-requests), but it is feasible to cache at least some data in sub-parts that are aggregated to provide a full provider node.

Some or all of the requested data may not be cached (or may be cached but expired) in the front-end cache(s) 124. For such needed data, in one or more implementations, the front-end data service 118 is coupled (e.g., via a network 126, which may comprise an intranet and/or the internet) to make requests 128 for data 130 to a back-end data service 132.

The back-end data service 132 similarly may comprise a number of load-balanced physical and/or virtual servers (not separately shown) that return the requested data, in a manner that is expected by the front-end data service 118. The requested data may be contained in one or more back-end data caches 134. For example, each load-balanced back-end server may have an in-memory cache that contains the requested data, and/or there may be one or more back-end caches shared by the back-end servers.

For requests that reach the back-end data service 132 but cannot be satisfied from any back-end cache 134, the back-end data service 132 is further coupled (e.g., via an intranet and/or the internet 120) to send requests 136 for data 138 to one or more various backing data sources 140(1)-140(n). Non-limiting examples of such data sources 140(1)-140(n) may include key-value stores, relational databases, file servers, and so on that may maintain the data in virtually any suitable format. A client request for provider node data may correspond to multiple sub-requests, and these may be to backing data sources; the data service 110 is configured to make requests for data in appropriate formats as needed to the different backing data sources 140(1)-140(n). Moreover, one data store's data may override another data store's data; e.g., the data for a television show may include a generic image URL obtained from one data store, however an "editorial"-like data store may override the generic image with a different image, such as for some uncharacteristic episode. Note that in one or more implementations, non-cache data sources 140(1)-140(n) may use a wrapper that implements a common cache interface, whereby each remote data source 140(1)-140(n) may be treated like another cache from the perspective of the back-end data service 132.

As is understood, in a user interface that includes displays of menus of tiles (and/or buttons), each menu object and tile (or button) object may correspond to a provider node's data, which may be made up of multiple component parts. For example, a menu provider node may contains tiles and/or buttons, including an example tile that may obtain its data from a feature type provider node, which includes sub-parts comprising text and a representative image URL or the like, as well as possibly other sub-parts (e.g., rating).

Figure 2:
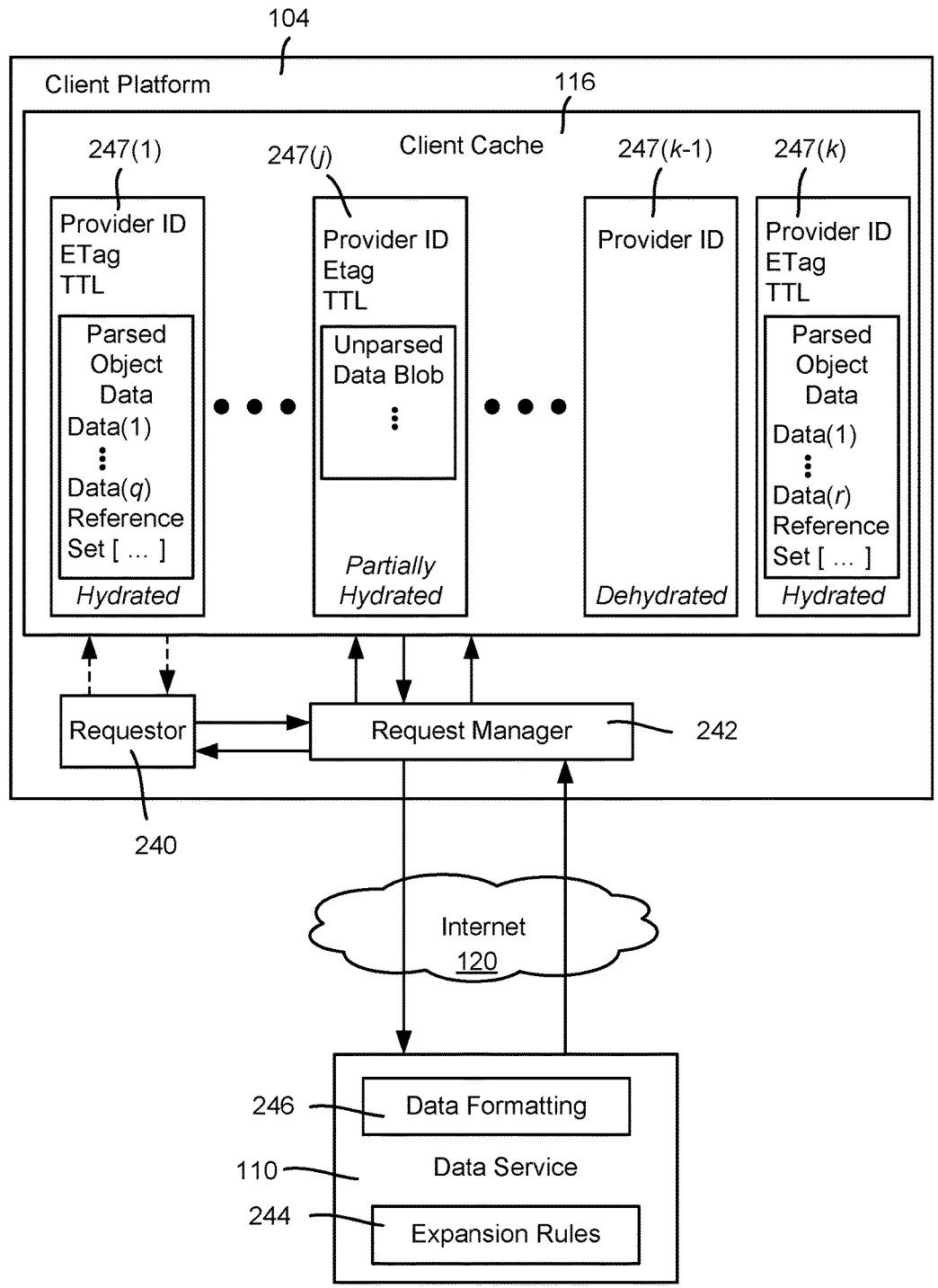
FIG. 2 is an example of a client cache containing information corresponding to provider nodes and data in various states, according to one or more example implementations.

FIG. 2 shows an example of some data that may be maintained in the client cache 116 to represent provider nodes in the graph. In general, the client platform 104 includes or is coupled to the cache 116. In one alternative implementation, a requestor 240 passes its request to a request manager 242 that first checks the cache 116 to determine whether the needed data is in the cache 116. If so, and the data is not considered expired, the request manager 242 uses the data from the cache 116 to respond to the request. In another alternative implementation the requestor 240 itself may check the cache 116 (represented by the dashed arrows between the requestor 240 and the cache 116), and only pass a request for the data to the request manager 242 if the data is not found or is considered expired in the cache 116.

For requests not satisfied via the cache 116, the request manager 242 communicates (e.g., via the internet 114) with the data service 110 (the client facing front-end 118) to obtain the requested data. One example request manger 242 that also may perform batching and multiplexing operations is described herein with reference to FIGS. 3-5.

The exemplified data service 110 may include expansion rules 244, which, if applicable to a given request, may expand the request into a larger query in anticipation of more data being desired than is currently being requested. In general, if expansion applies, at least one more provider node than requested is returned. The data service 110 also may include a data formatting mechanism 246 that formats and shapes the data response into what the client device and/or software platform version expect with respect to the request.

In the example implementation of FIG. 2, each exemplified cache entry 247(1)-247(n) includes a data service-unique provider node identifier (ID) that corresponds to a key to any associated value (data) in the store maintained for that provider node in the cache location. For example, the provider node ID may be used by a hash function to determine the key/cache location, e.g., in a hash-mapped cache. Not all cache locations may have data therein.

In general, in one or more implementations, on the client device a provider node corresponds to an object that is instantiated with its data when needed in the client graph. However a provider node may be "instantiated" without having its data retrieved, or a provider node may have its data retrieved but not yet parsed into object form. Thus, in one or more implementations, a provider node may be maintained in the client cache 116 one of multiple (e.g., three) different states.

One possible state, referred to as a dehydrated state, is shown for entry 247(k–1), in which the provider node is known to exist but the data for that provider node has not yet been retrieved. For example, before a request is made some of the provider nodes in the graph may be known based upon a reference from at least one other provider node, and such a reference may be used to set up an entry in the client cache 116. If not already set up, when a request is made from the request manager 242 to the data service 110, the provider node ID may be added to the cache 116. For example, in one or more implementations, a client request for provider node data may have an asynchronous promise for that data initially returned (wherein a "promise" in asynchronous programming environments is basically a placeholder in which data is returned when ready, sometimes referred to as a "future" or "delay"). For such a promise, the provider node ID may be placed in the cache 116, with the data later made available in the cache 116 and used when actually received and the promise resolved. Note that for a dehydrated entry such as the entry 247(k–1), an expiration value (e.g., date/timestamp or time-to-live/TTL value) may be present by default or the entry otherwise flagged in some way so as to not evict the provider node ID from the cache 116 too quickly.

Another state, referred to as a hydrated state, is shown for entries 247(1) and 247(k). In the hydrated state, the provider node data is present and ready for use in the graph, that is, the provider node data that had been obtained (as an unparsed data blob such as a JSON object) has been thereafter parsed from the unparsed form into a useable object form in the cache 116. When a client request for a provider node's data is processed, the cache 116 is accessed and the corresponding provider node data returned if the provider node is cached in the hydrated state (and not considered expired).

Yet another state is a partially hydrated state, shown for cache entry 247(j). More particularly, in an implementation in which a provider node may be received in anticipation of its need, e.g., via the expansion rules 244, the data may be cached as received, e.g., as an unparsed data blob (e.g., a JSON object). In such an implementation that uses a partially hydrated state, only if and when the data is actually needed for a client request is a partially hydrated cache entry parsed (e.g., by provider node code) into a hydrated cache entry in object form for use by the requestor 240. This optimization is not necessary, but when used, avoids the computational expense of parsing a provider node data blob into the object format unless and until the provider node's hydrated object data is needed.

Figure 3:
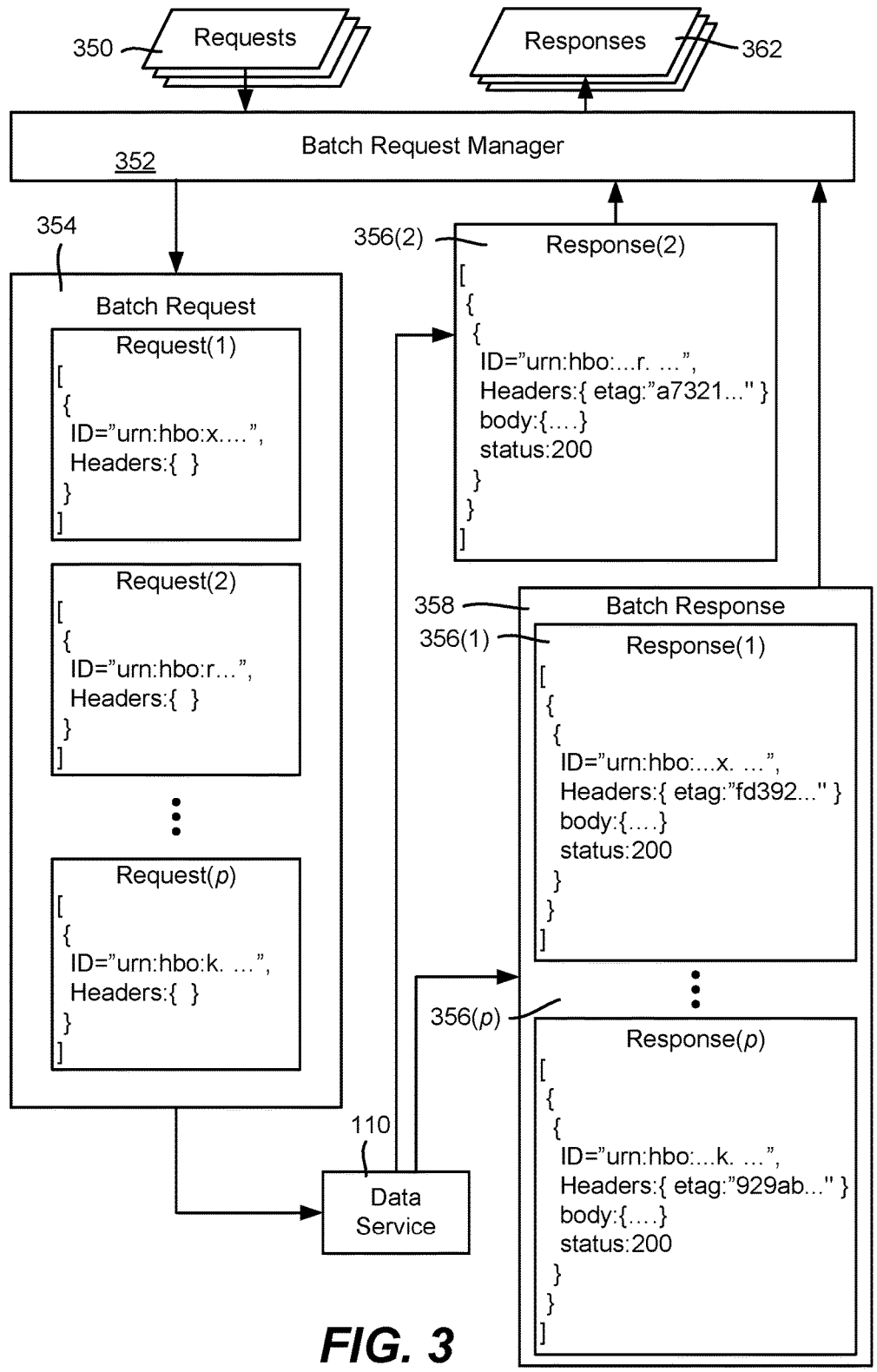
FIG. 3 is an example representation of how client requests to a data service may be batched with streamed responses returned, according to one or more example implementations.

Turning client requests for a provider node (and possibly other data), as described herein multiple requests may be batched for efficiency. Batching may be performed by the client platform software, e.g., at a client data access layer below the user interface part of the client platform. For example, the client request manager 242 of FIG. 2 may comprise a batch request manager 352 as represented in FIG. 3, and may perform batching operations as described herein. For further efficiency, the batch request manager 352 also may perform request multiplexing, which in general eliminates multiple (e.g., duplicate) requests for the same data, by sending a single request, and de-multiplexing the single response into multiple responses, one to each multiple requesting entity.

By way of example, as represented in FIG. 3, client data requests 350 may be independently seeking pieces of data generally at the same time, and such requests may be batched by the batch request manager 352. For example, a client requestor such as a UI a tile object may request a title, rating, image URL and so forth in a one or more requests or a combined request for a single provider node's data. As another example, a menu object requestor may request set of tiles to present on its menu object rendering, and each tile may correspond to a request for feature provider node; such a request may be batched when made by the menu object requestor and received as a batch request at the batch request manager. Thus, multiple single and/or batch requests for provider node data may be made to the batch request manager 352, which the batch request manager 352 can combine into a batch request (or batch requests) for sending to the data service 110. In general, sending batch requests to the data service 110 is more efficient than sending single requests.

Moreover, the same data may be independently requested at generally the same time by different client requestors. For example, a button and a tile may seek the same provider node data (e.g., an image URL) without any knowledge of the other's request. Request multiplexing at the batch manager 352 allows for combining such independent requests for the same provider node into a single request for a provider node to the data service 110, with the provider node data from the single response returned separately (de-multiplexed) to each requestor.

In one or more implementations, the batch request manager 352 may batch up to some maximum number of requests over some defined collection time. For example, a batch request to the data service 110 may range from one request up to some maximum number of (e.g., sixteen or thirty-two) requests per timeframe, such as once per user interface rendering frame. If more than the maximum number requests are received within the timeframe, then multiple batch requests are sent, e.g., at the defined time such as once per rendering frame, although it is feasible to send a batch as soon as a batch is full regardless of the defined time. The request and response may be in the HTTP format, e.g., using a REST-like API.

As generally represented in FIG. 3, although the batch request manager 352 batches multiple requests 350 (when possible) into a single batch request 354, the requests may be processed at the data service 110 as if independently streamed. Thus, in one or more implementations, individual and/or batched responses may be streamed back by the data service 110 to the batch request manager 352, that is, as a full batch response, or in multiple sets of partial results, e.g., as soon as each individual response is ready, such as within some return timeframe. Thus in the example of FIG. 3, the response 356(2) is returned separately from the batch response 358 that contains (at least) the response 356(1) and 356(p), e.g., returned at a later time. For example, the response 356(2) may be obtained from a cache at the data service, in which event the response 356(2) may be quickly returned, whereas other responses may need to be built from the backing data sources and thus take longer to obtain and compose into provider node data blobs before returning.

In one or more implementations, a response is returned for each request, and the responses may come back in any order. Expanded results also may be returned as described herein, e.g., via the expansion rules 244 of FIG. 2. Note that requests may be made by data item identifier, and the returned response information may include the data item identifier and the associated data (including headers such as an ETag, and a cache expiration value) and its data body. Each response may be the requested data item or an error, and thus a status code is included in the response information.

The results thus may be streamed, each with a status code; for a batch response, the status code indicates that an individual status code is found in the body of each response portion. Even though a response may reference one or more other provider node IDs in its reference set, those other provider nodes need not be returned in the same response. Indeed, responses are not nested (e.g., as they correspond to graph data, and are not like tree data) but rather remain independent of one another, and thus the client can independently parse each response, cache each response's data, and so on.

As can be readily appreciated, processing batched requests as individual requests having individual responses allows the data service 110 and thus the batch request manager 352 to return a provider node to a client/client requestor without waiting for another provider node. Such streamed responses may be particularly beneficial when multiplexing. For example, if one client requestor is requesting provider node X while another requestor is requesting provider nodes X and Y in a batch request, the de-multiplexed response to the multiplexed request for provider node X to the one client requestor need not be delayed awaiting the response for provider node Y to be returned (e.g., because the data for provider node Y is taking longer to obtain).

Although the requests to the data service are batched (possibly multiplexed) and may have individually or combined streamed responses, as set forth above the initial requests 350 to the batch manager 352 may include a batch request seeking a batch response. Such a batch request made by a requestor may receive a batch response from the batch request manager 352 only when each of its batched requests has a response returned. For example, a menu object that requests a number of items in a batch request may want the items returned as a batch, e.g., in the requested order, rather than have to reassemble responses to the items returned individually. In this way, for example, a menu object may request a batch of tiles and receive the tiles as a batch. The batch request manager 352 is able to assemble the data of separate provider nodes into a batch response as described herein.

Figure 4:
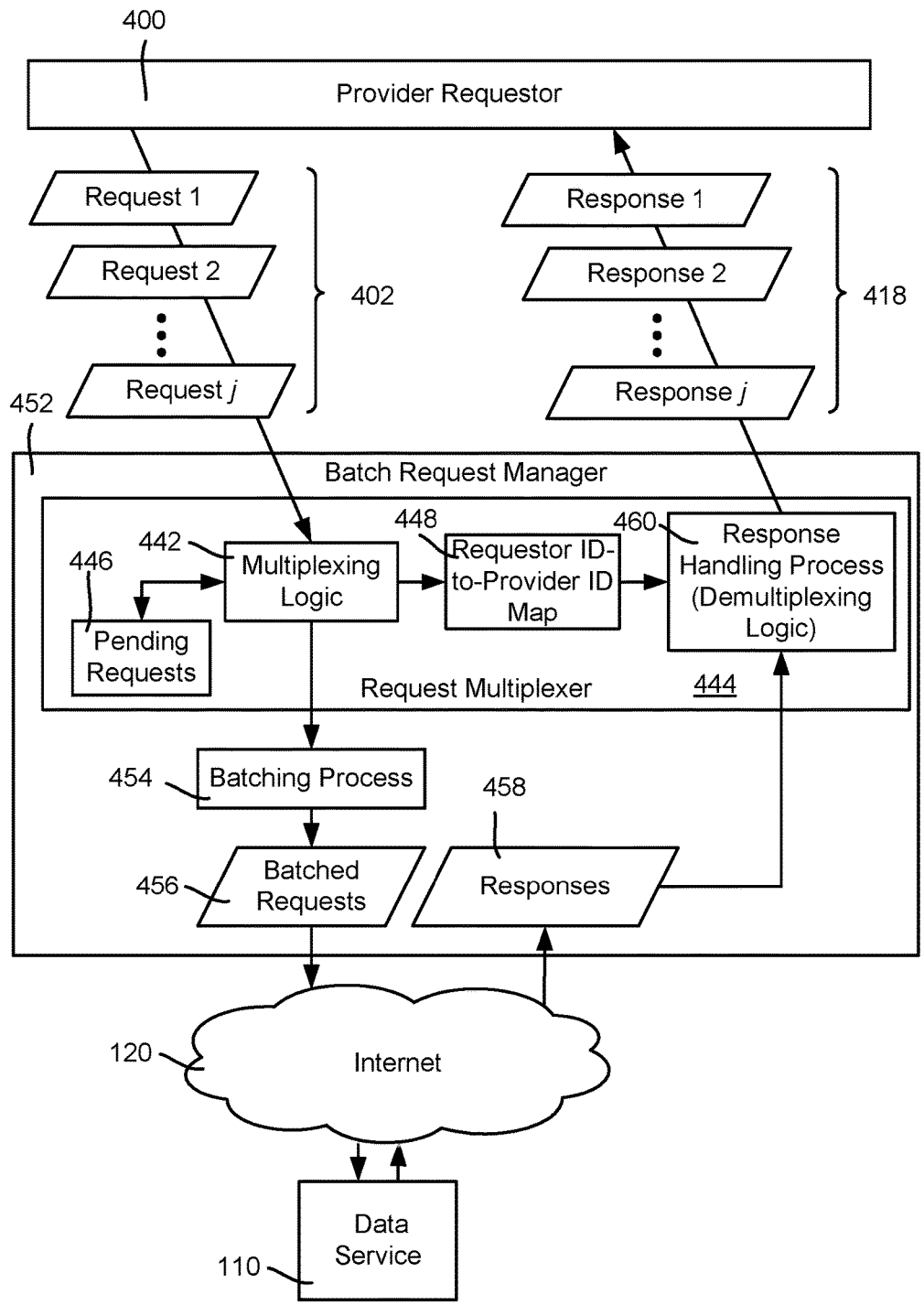
FIG. 4 is an example block diagram representation of a batch request manager of a client software platform configured to multiplex and batch requests for sending to a service, according to one or more example implementations.

FIG. 4 shows additional details of an example batch request manager 452 at the client software platform. In general, a provider node requestor 400 such as part of the user interface navigation and rendering components make requests 402 (request 1-request j). Although not shown in FIG. 4, as described above the request manager 452 or another component (e.g., the requestor) may first check the client cache to see if the data is present and valid therein, and if so, use the data from the cache.

Those requests that are not satisfied with data from the client cache are further processed by the batch request manager 452. Each request is associated with some requestor identifier (e.g., the requestor object ID) and requested data item identifier (e.g., the provider node ID for which data is sought), whereby responses 418 (response 1-response j) are returned for each request 402 (request 1-request j) to the corresponding requestor. If needed in a given implementation, the requestor ID may include a secondary identifier such as a counter value in the event that the same requestor makes multiple requests for data; e.g., requestor E makes a batch request 1 (E.1) and also makes another request 2 (E.2) while batch request 1 has not yet received a response. Such a scheme allows mapping the returned data back to the requestor as well as differentiating responses back to the same requestor.

The request manager 452 is provided for in part for efficiency, namely to handle such requests and responses in a way that reduces the load upon the network and the data service 410. As described herein, in one or more implementations, such efficiency is obtained by batching requests and multiplexing requests, (although batching may operate alone, without multiplexing being used in a given implementation).

Batching generally is directed towards including multiple requests into a single batch request, which is generally more efficient than making individual (or smaller batch) requests. To this end, a batching process collects requests for some amount time, e.g., corresponding to a rendering frame, and then sends a batch request when the time is reached. The number of requests in a batch may be limited, e.g., to sixteen or thirty-two, and thus to handle a larger number of requests, multiple batch requests may be sent per time window, e.g., generally at the same time, but alternatively a batch may be sent as soon as that batch is full.

Multiplexing generally refers to making a request for the same data only once, basically filtering out duplicate data requests from different requestors. As described herein, multiplexing may be done by tracking pending requests, (e.g., by data item identifier such as the requested provider node ID) and only making a request for the data when another request for the same data is not already pending. A pending request may be considered one that has been previously made but has not yet received a response, as well as one that has been already added to a batch "buffer" waiting to be sent. As used herein, a batch buffer may be any suitable data structure, including one generally formatted for sending as a batch request once the request-related information is added thereto. As can be readily appreciated, because a multiplexed request results in a single response that has to be sent back to multiple, different requestors, some tracking needs to be done so that a multiplexed request may be mapped back to each of its initiating requestors.

By way of example, consider that among the many requests handled by a given request handling server, five different requestors have made requests corresponding to provider nodes that either are in a dehydrated state, cache miss or expired cache data condition, which causes a need to have the data service 110 invoked. Thus, the batch request manager 452 multiplexes and/or batches these five requests. As part of multiplexing, the batch request manager 452 has a mapping mechanism that maintains a relationship between which request corresponds to which requestor.

As a more particular example, consider that both requestor 1 and requestor 2 have requested data for some data provider node identified as "Q" (in one implementation, a data service unique uniform resource name, or URN is the identifier). The multiplexer logic detects this, and only makes a single request to the data service for the Q data. However, when the single response comes back with the Q data that satisfies the single request for Q, the request manager's mapping mechanism (which may be considered a "de-multiplexer") recognizes that this data applies to two different requestor requests, and thus that requestor 1 needs its own response with data Q, as does requestor 2. Two responses are thus returned to the two requestors, one for each request.

Thus, in FIG. 4, multiplexing logic 442 receives the requests 402, (which may include batch requests and/or single item requests), and for each request, maps a requestor identifier (ID) to the provider node identifier in a suitable data structure exemplified as a requestor ID-to-provider node ID map 448. For each request the multiplexing logic 442 also checks a set of pending provider node IDs 446, to determine whether a request for that provider node is already pending. If so, the request is not made again, otherwise the request is forwarded to a batching process 454.

The batching process 454 collects such requests, and sends a set of one or more batched requests 456 to the data service 110, e.g., over a suitable connection of the internet 120. The data service 110 returns a response for each request, shown as responses 458. A response may contain response data that satisfies its corresponding request, but may contain an error code or the like when the request cannot be satisfied with data.

As set forth above, requestors may send batch requests among their requests 402, which may be returned as batch responses in the responses 418 to the requestors, that is, when all batched requests have received a response. However, as described herein, the responses 458 to multiplexed batched requests 456 need not be returned as a corresponding batch, but may be separately streamed when ready (although if ready together, such streamed responses may include partially batched or fully batched response data). In this way, the responses 458 to multiplexed and batched requests 456 may be returned without waiting for a full set of responses to such a batch request, as doing so may delay other responses. For example, if requestor 1 requests A, B and C in a batch request, and that request is made in multiplexed, batch request to the data service 110, and requestor 2 requests A and B (not sent to the data service, because A and B are already pending), then there is no reason for requestor 2 to have to wait for request C to complete (although it was multiplexed and batched with A, B and C), as C may take a relatively long time to complete.

As described herein, a response may correspond to multiple requestors, and thus a response handling process 460 (de-multiplexing logic) uses the requestor ID-to-provider node ID map 448 to return a response for each request. Note that a response may be in the form of an error message, or may include an error message possibly along with requested data; (e.g., a response to a requestor batch request for A, B and C may return data for A, data for B and an error for C).

Figure 5:
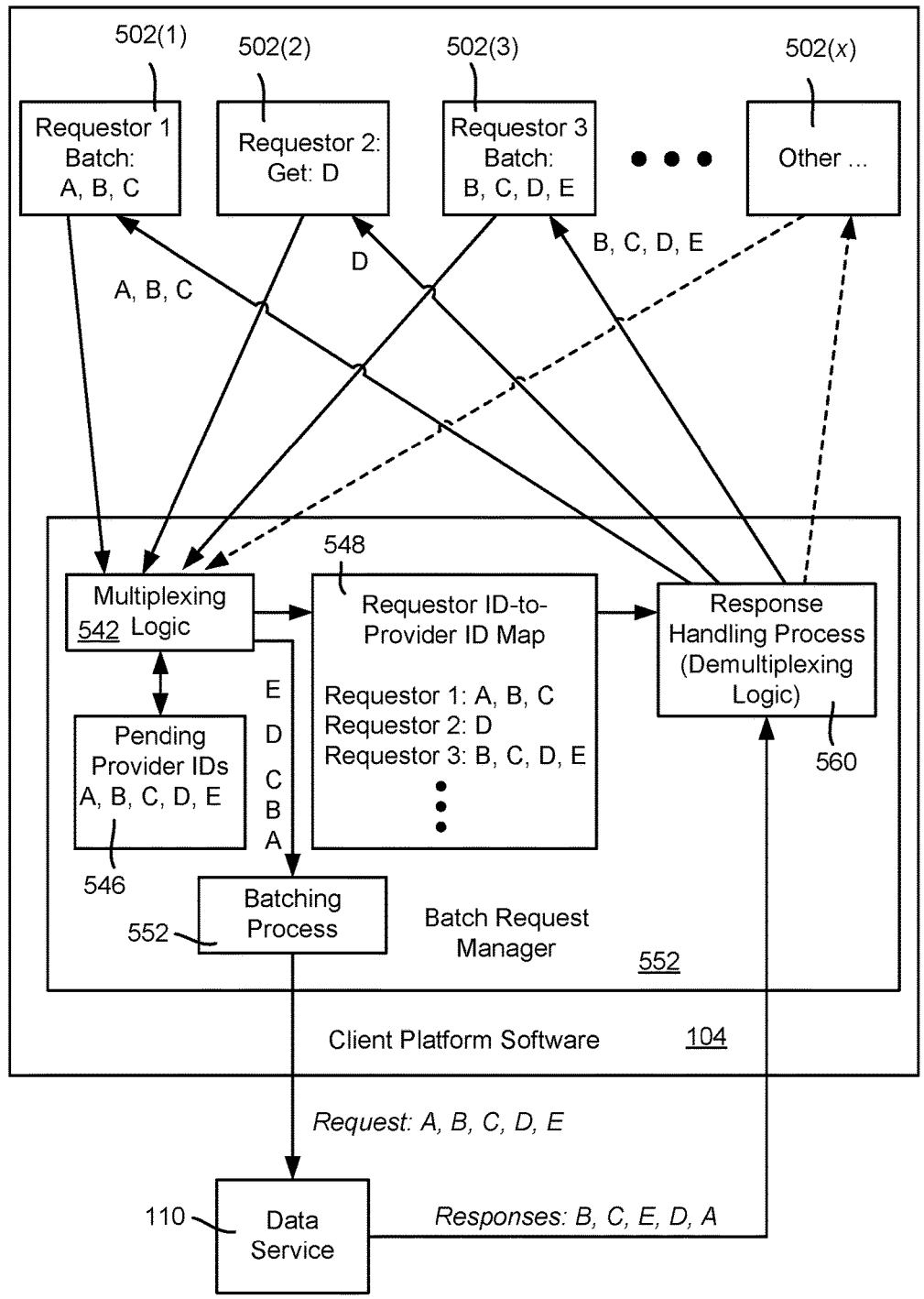
FIG. 5 is an example block and representation of a client batch request manager showing how data requests may be multiplexed, batched and sent, with responses returned and de-multiplexed for returning, according to one or more example implementations.

FIG. 5 shows an example of a batch request manager 552 of the client software platform 104, with requests (A)-(E) made by various requestors 502(1)-502(x). In FIG. 5, requestor 502(1) makes a batch request corresponding to data request (provider node) IDs (A), (B) and (C), requestor 502(2) makes a get request corresponding to data provider node ID D, and requestor 502(3) makes a batch request corresponding to data provider node IDs (B), (C), (D) and (E). There may be other requests as well, as represented by block 502(x), however for purposes of this example consider that only requestors 502(1)-502(3) are making requests within this batching timeframe.

The requests 502(1), 502(2) and 502(3) are processed by the multiplexing logic 542 of the batch request manager 528. As the requests 502(1), 502(2) and 502(3) are received, the multiplexing logic 542 updates the requestor ID-to-provider node ID map 548. Further, duplicate requests are handled by checking the pending request ID list 546 so as to only add one instance of each request ID to the pending request ID list 546 and thereby send only one single corresponding request to the batching process 552.

At an appropriate time, e.g., once per rendering frame, the batching process 552 sends a batch request for items (A), (B), (C), (D) and (E) to the data service 110. The data service 110 returns data (e.g., from one of its front-end caches when cached, or attempts to obtain the data from the back-end service/one or more data stores if not cached at the front end). To reiterate, the responses from the data service 110 need not be batched in this example, and may be returned in any order, e.g., responses for data items (B), (C), (E), (D) and (A) are returned in the example of FIG. 5.

Any of these requests may result in an error response rather than the actual data. Moreover, in one or more implementations, expired data (If available) may be returned in response to a request instead of a failure message, possibly with some indication (e.g., the expiration time itself) that the data is expired.

As described herein, these responses, which were multiplexed, need to be mapped back to their requesting requestors. This is performed by the response handling process 560, using the map 548 to build a response for each requestor. If the requestor made a batch request, in one or more implementations the response to that requestor may be batched. Alternatively, a response to a requestor's batch request may not be batched, but returned as received, basically in a "stream" of responses back to the requestor.

Figure 6:
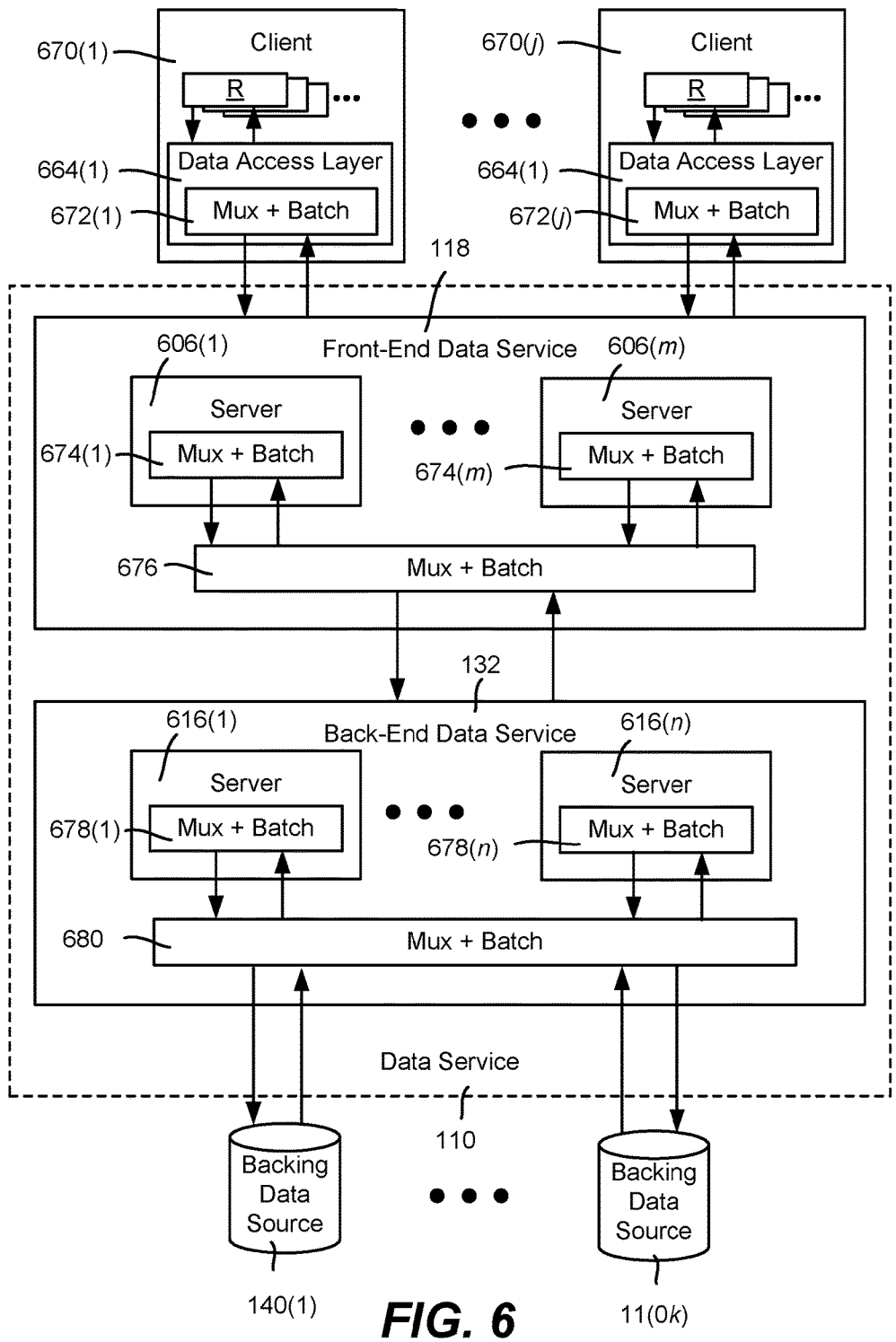
FIG. 6 is an example block diagram representation of how multiplexing and/or batching may be implemented at various levels, including in the clients and data service, according to one or more example implementations.

As described herein, the client platform software 104 includes a data access layer below the client requestors that performs batching, and optionally multiplexing, of client requestor requests. This is generally shown in FIG. 6 by data access layers 664(1)-664(j) below client requestor objects R. For purposes of explanation, batching and multiplexing operations are described herein at this data access layer level, which batches and/or multiplexes requests to the data service, with reference the flow diagrams of FIGS. 7-16.

Notwithstanding, It should be understood that batching operations, as well as multiplexing operations, may be performed at any request-response level, including any time a requestor makes network requests to an entity that is intended to ultimately respond with the data (or an error response). For example, as represented in FIG. 6, in one or more implementations, client data access layer components 664(1)-664(j) of 670(1)-670(j) may multiplex and/or batch requests via multiplexing and batching components 672(1)-672(j), respectively, to the data service 110. In one or more implementations, each such request is processed by one of the load-balanced front-end servers 606(1)-606(m) of the front-end data service 118 to obtain corresponding responses. As represented via multiplexing and/or batching components 674(1)-674(m), each front-end server 606(1)-606(m) may multiplex and/or batch its requests to the back-end data service 132. Note that the client requestors 670(1)-670(j) need not know about the front-end data service 118, back-end service 132 and/or backing data sources 140(1)-140(k), and instead make the requests (e.g., HTTP internet requests) to the client platform 104 (FIG. 1), and from there as needed to a data-providing entity in general from the perspective of the client device. In one or more implementations, the data service 110 couples to the client devices via the front-end data service 118.

The back-end data service 132 may be the data-providing entity from the perspective of the front end servers 606(1)-606(m). However, in one or more implementations, it is feasible for the front-end data service 118 to include a front-end shared multiplexing and/or batching component 676 that multiplexes and/or batches the requests from its set of servers 606(1)-606(m) on their way to the back-end data service 132. Although not explicitly shown in FIG. 6, there may be more than one shared multiplexing and/or batching component, e.g., with the servers 606(1)-606(m) grouped into subsets, each subset sharing one of the multiplexing and/or batching components; (distribution by load-balancing or other means are alternatives to a fixed groups of subsets). It is also feasible to let each server individually multiplex and/or batch its requests to the back-end data service 132, whereby the shared component 676 is not needed.

Similarly, each back-end server 616(1)-616(n) of the back-end data service 132 may have multiplexing and/or batching components, shown as 678(1)-678(n), respectively. At least one shared multiplexing and/or batching component 680 may multiplex and/or batch the requests from its set of back-end servers 616(1)-616(n); if implemented, more than one shared multiplexing and/or batching component 680 is feasible, as described above with respect to the front-end data service. It is also feasible to let the back-end servers 616(1)-616(n) each individually multiplex and/or batch its requests to the backing data sources 140(1)-140(k), whereby the shared component 680 is not needed. Thus, the back-end data source(s) 140 are the data-providing entity from the perspective of the back end servers 616(1)-616(n) or the back end data service 132 in general.

Figure 7:
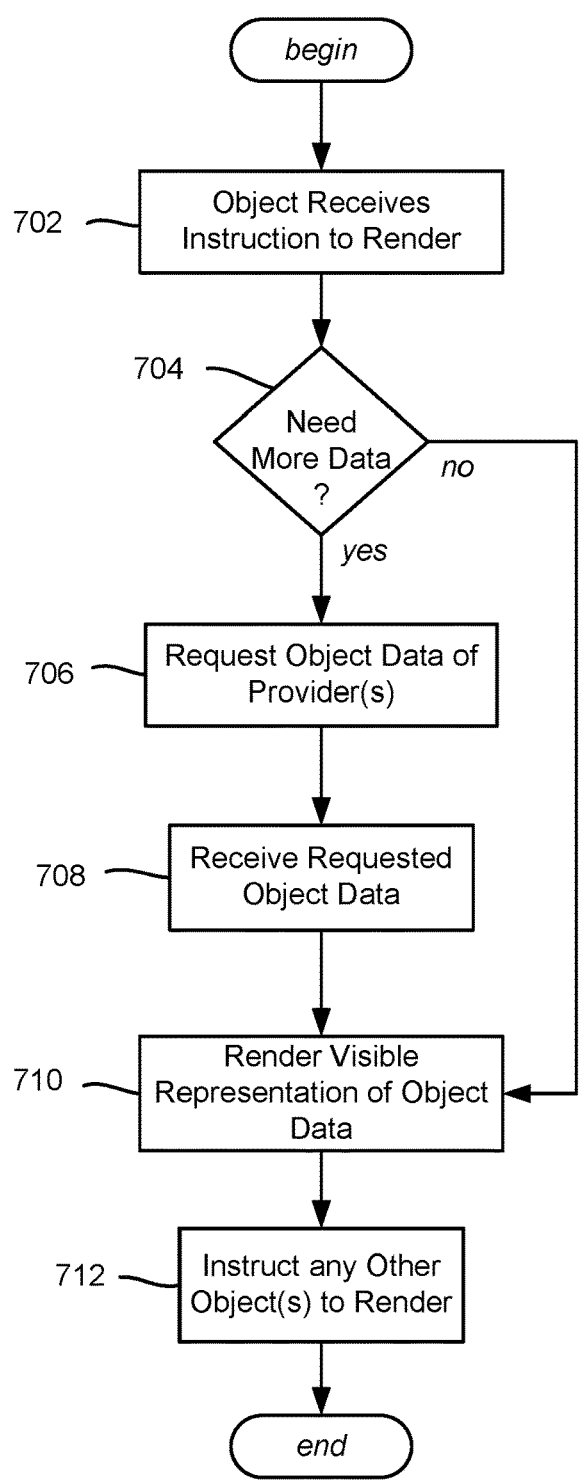
FIG. 7 is a flow diagram showing example logic/steps that may be taken by a client requestor (e.g., user interface object) to request, receive and use provider node data, according to one or more example implementations.

FIG. 7 is a flow diagram showing example steps that may be taken by a user interface object to render a visible representation of itself, including requesting any needed provider node object data. Step 702 represents the object receiving an instruction to render itself. For example, a menu may be selected via a button, and that menu gets instructed to render itself. Note that in one or more implementations, the root menu is hosted, and receives such an instruction from its host.

Step 704 represents the object determining whether it needs more data to render. For example, the object may be a child object that the parent has already requested. Also, for any other reason an object have been recently rendered or virtualized (instantiated in anticipation of a need for rendering), whereby the object may still be instantiated in memory. If no data is needed, step 704 branches to step 710 to render a visible representation of its object data.

If data is needed, step 706 requests the data, and step 708 receives the data. Note that in an asynchronous programming environment, the request may first receive a promise, with the data becoming accessible when the promise is fulfilled. The promise may be fulfilled via cached data, or via a request to the back-end that needs to be obtained from the data sources, and thus there is some delay between step 706 and step 708, with the length of the delay generally related to where the requested data resides. Once the needed data is returned, as described above step 710 renders a visible representation of the object's data.

Step 712 represents instructing any other object or objects to render, which are basically child objects that each perform steps similar or identical to those of FIG. 7. For example, a menu may render itself as a rectangle having various visible properties such as size, color and so forth, possibly along with a logo (image) and a background image, and then instruct its child buttons to render. In this recursive way, child objects can generally obtain data (that builds the graph) as needed and render representations of themselves atop their parent objects, and so on until each child object that has no children is rendered.

Notwithstanding, a parent object can request data for child objects (e.g., at steps 704 and 706) before requesting that the child objects render themselves. For example, a menu can make a batch request for a number of its child objects at once (e.g., to appear as the menu's buttons or tiles when rendered), and then after rendering the menu representation of itself, request the child objects to render. Note that, a menu object may only request a subset of its children, e.g., only those that are currently scrolled into view; as a more particular example, to save resources a "Movies A-Z" menu may only want a dozen or so of its hundreds or thousands of children (each representing a movie) to be instantiated at any one time. Note however that a menu object may request more than its currently visible children, e.g., to virtualize additional children in advance, in anticipation of their being scrolled into view, which typically provides a better scrolling experience to the client user.

Figure 8:
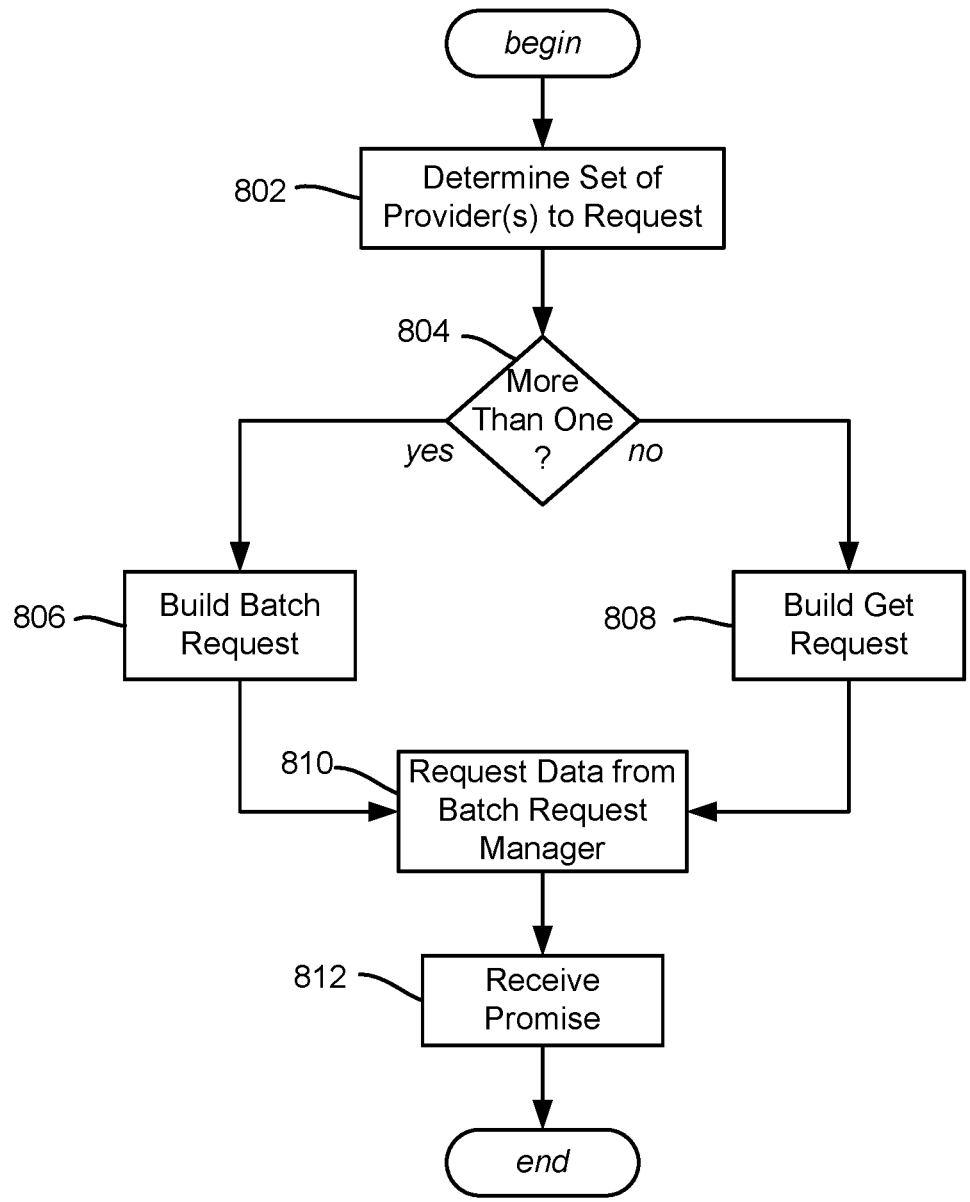
FIG. 8 is a flow diagram showing example logic/steps that may be taken by a client requestor to submit requests for provider node data, according to one or more example implementations.

FIG. 8 is a flow diagram showing example steps that may be taken by a client platform component requestor to obtain provider node data; (note however that the example of a provider node or multiple provider nodes is only for purposes of explanation, and that any identified data item, including but not limited to a provider node, may be requested and have data returned in response to the request in a given system). For example, the component that requests the data may be a UI object that needs provider node data to render a visible representation of (at least part of) itself, such as a menu that is requesting tiles, possibly including virtualized tiles (their data is desired in advance for likely future rendering, e.g., if the user scrolls new tiles in the menu's visible area). The logic of FIG. 8 (generally corresponding to step 706 of FIG. 7) may be triggered whenever provider node data is needed, e.g., at program startup, when user interaction changes the displayed objects, when another event occurs (e.g., a timer reaches a time limit or certain time of day), and so on. Note that as described herein, other components (including provider nodes) may be independently making similar requests at generally the same time, including possibly for the same provider node.

The provider node graph built by each client is a subset of the full set of provider node data maintained by the data service, e.g., that forms a "virtual" graph. Note that client-specific provider nodes such as a user provider node or a watch-list provider node are not available to other clients, and it is feasible to limit the provider nodes to which a client has access based upon parental controls and the like. In general, the client only requests the provider nodes that are needed to render user interface representations of the provider node data, plus possibly some additional provider nodes for object virtualization. Note that the data service also may expand the request to return more provider nodes than actually requested. The client may cache provider nodes' data, and thus the client provider node graph maintained at the client may be larger than the rendered portion thereof.

Step 802 represents a requestor determining the set of provider nodes to request, e.g., for requesting in a get request or a batch request. For example, a client may need to render a "Genre" menu, and thus step 802 determines from the set of references in the Genre provider node data what other provider nodes (e.g., comprising tiles, buttons and so) on need to be obtained to properly represent the "Genre" menu. Data from the Genre menu provider node is thus requested as needed.

Each other referenced object may request its own data from a provider node. For example, a tile object (e.g., representing a movie) referenced by the Genre menu object seeks at least a title from the provider node that contains the movie data for that tile object; (a tile may request additional information from the provider node, such as a rating, image URL and so forth). As set forth above, note that for some menus, not all of the provider nodes contained in the reference set may be requested at once. In the above example, a menu object such as "Movies A-Z" (in which the Movies A-Z menu provider node may reference hundreds or even thousands of movie tiles in its reference set) may request; only a subset of these (e.g., those currently scrolled into view plus possibly a few virtualized ones), as too many resources would be consumed by requesting all of the tiles' data.

Step 804 branches to step 806 to build a batch request if more than one provider node request is being made by a requestor, e.g., ten feature provider nodes for a menu provider node. Otherwise step 808 builds a get request for a single provider node. Step 810 sends the batch or get request. Step 812 represents receiving a promise for the data in an example asynchronous programming environment.

Figure 9:
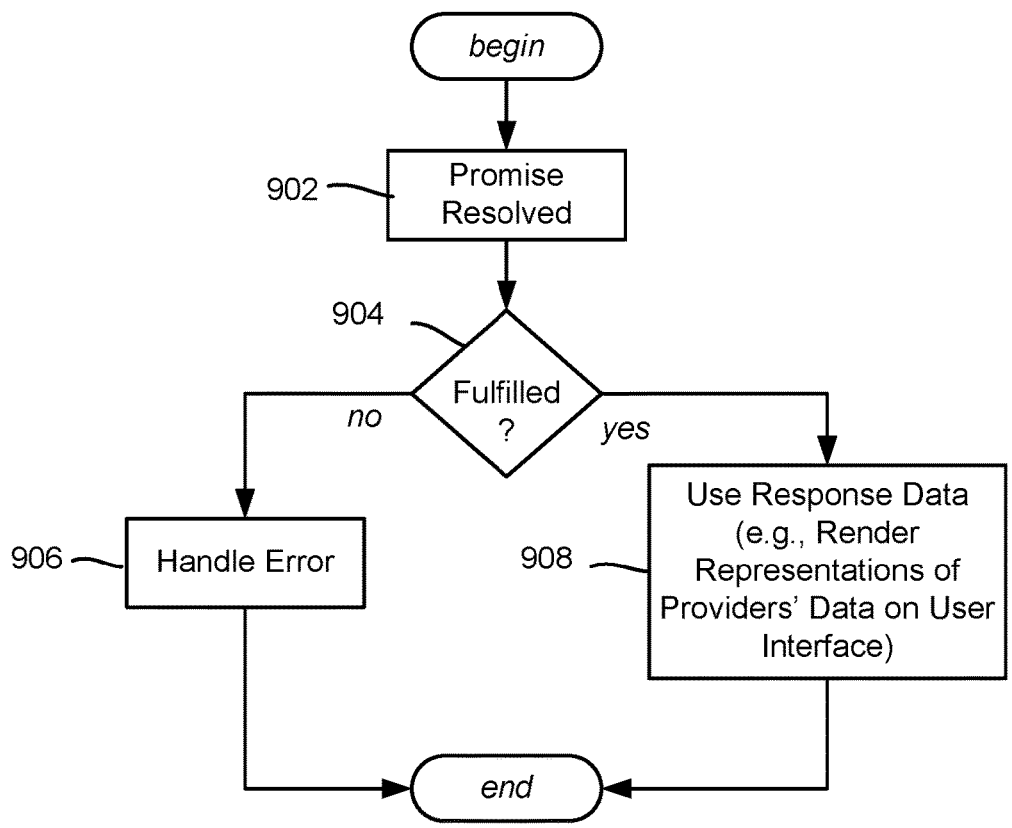
FIG. 9 is a flow diagram showing example logic/steps that may be taken to handle a response to a client request for provider node data, according to one or more example implementations.

The example steps of FIG. 9 may be invoked when a promise is resolved (at step 902, generally corresponding to step 708 of FIG. 7). Step 904 evaluates whether the promise was fulfilled or rejected; (if rejected, step 906 deals with the error via an appropriate handler; such errors are not further described herein). When a promise is fulfilled, step 908 represents using the data in some way, e.g., to render a visible representation of the provider node(s) or part of the provider node(s), (which generally corresponds to step 710 of FIG. 7). For example, if a feature provider node for a requested tile is returned, the title may be retrieved from the provider node's object data and rendered as text; further, once a provider node's data is obtained its reference set is known, whereby a further request for one or more provider nodes referenced by that now-obtained provider node may be made, and so on. Note that a promise for a request may be fulfilled with a response that contains an error message rather than the provider node data. In such an event, the error message may be used to inform the client user of the problem.

Figure 10:
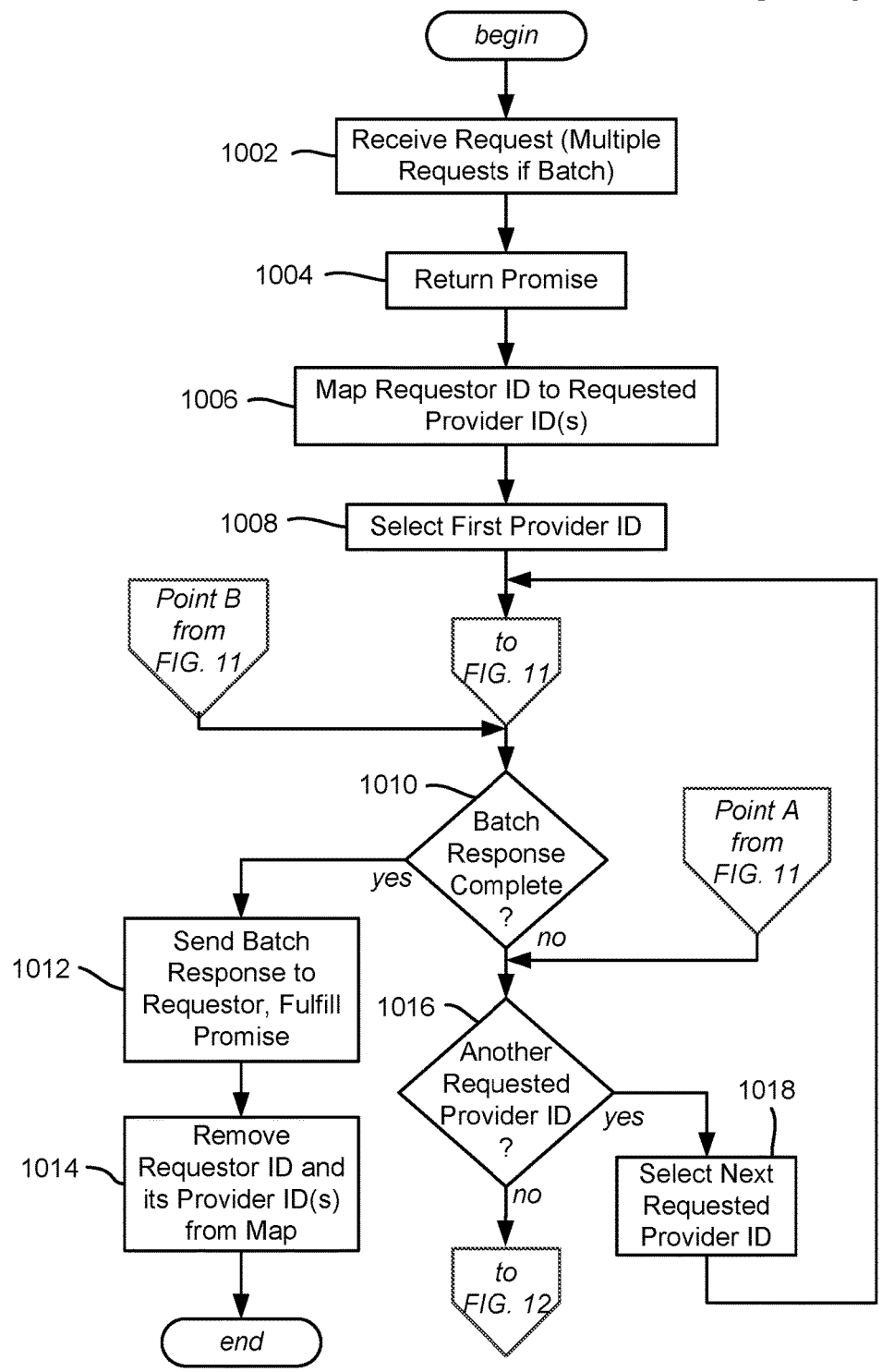
FIGS. 10-12 comprise a flow diagram showing example logic/steps that may be taken to handle requests for data at a client component, including to multiplex and batch data requests to a data service, according to one or more example implementations.
Figure 11:
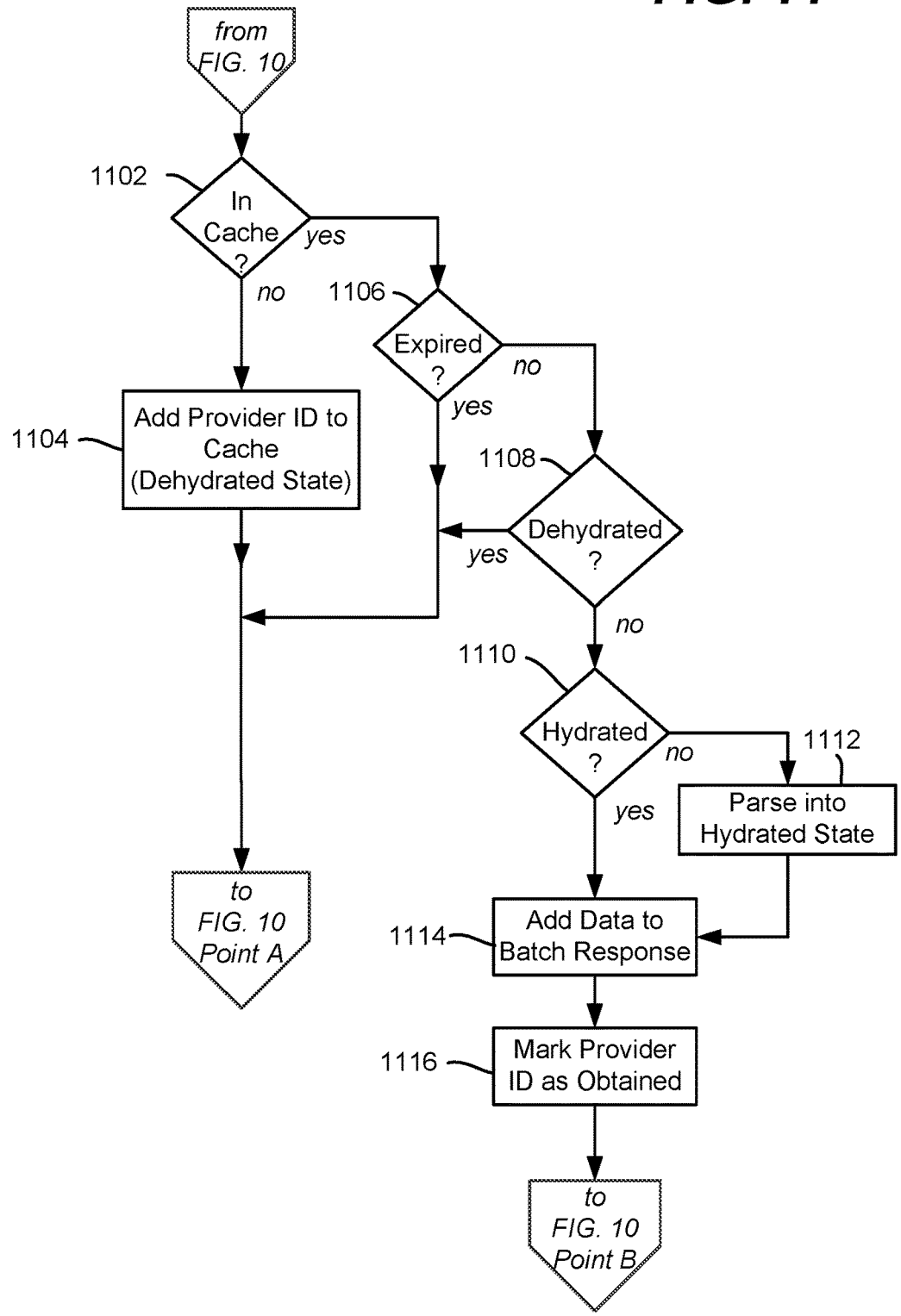
Figure 12:
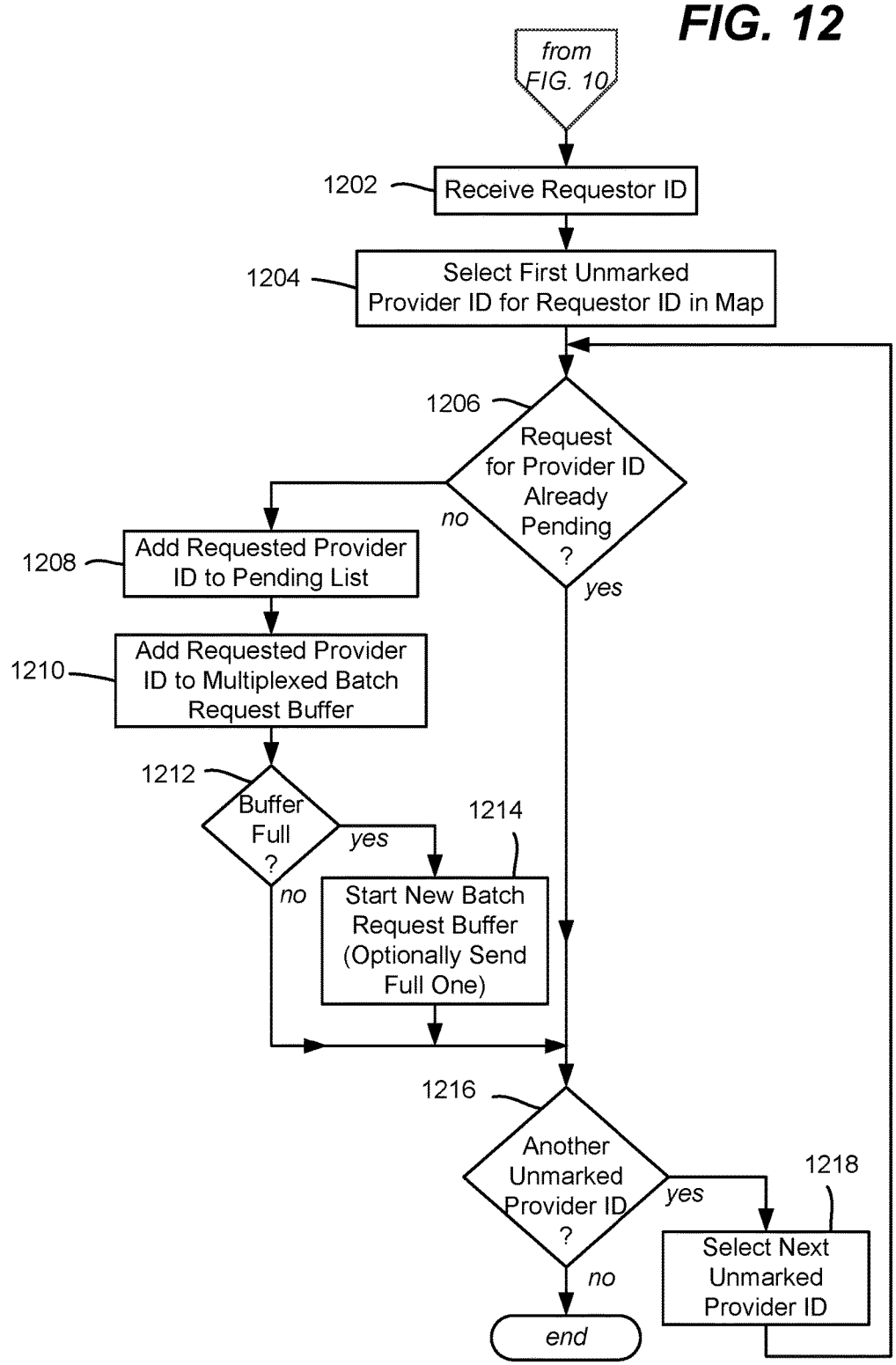

FIGS. 10-12 comprise a flow diagram showing example steps/logic that may be taken by a batch request manager when a request for data is received (step 1002). In this example, at step 1004 the batch request manager returns a promise for the data as appropriate for an asynchronous programming environment; (in other environments other techniques may be used with respect to retrieving the data, such as callbacks, synchronous parallel blocking threads and so on).

In one or more example implementations, the example batch request manager described in FIGS. 10-12 handles requests for provider node data by first accessing the client cache to look for the provider node and its requested data; (note that in alternative implementations, the requestor or another component may access the client cache and only invoke a batch request manager if fresh data is not available from the cache). The example batch request manager described in FIGS. 10-12 also handles either a client single "get" request or a client batch request in the same way, e.g., by considering a single request as if it was a "batch" request having a single provider node ID; (although in alternative implementations, single requests may be handled separately from batch requests, by generally similar logic). Thus, as used herein, except where otherwise noted a "batch" request from a requestor may be one that contains a single provider node ID get data request, (even though such a single request may not technically be considered a proper batch request in other contexts). Thus, step 1002 represents receiving a requestor's request, which may be a single "Get" request (or the like) with a data ID, or a batch request containing multiple data ID requests. Step 1004 represents returning a promise for the request.

Step 1006 represents maintaining the requestor-to-provider node ID(s) relationship, e.g., in the map 448 (FIG. 4). With this information, a response is able to be returned to each separate request for data, including when requests for the same data are multiplexed into a single data service request for that data and later de-multiplexed. If the same requestor makes multiple, separate requests, the map may contain a separate entry for each request so that the requestor gets back a response for each request.

Step 1008 selects the first provider node ID (which may be the only one) for the batch request from this client. The exemplified batch request manager process then continues to step 1102 of FIG. 11 to look for the requested provider node data for this provider node ID in the client cache.

If not in the cache at step 1102 of FIG. 11, step 1104 adds the provider node ID to the cache whereby the provider node is cached in the dehydrated state, (that is, with no provider node data). The process then returns to FIG. 10, point A, which corresponds to step 1016. If cached at step 1102, step 1106 is performed to evaluate whether the provider node data in the cache is expired. If expired, the process returns to FIG. 10, step 1016. If cached as evaluated at step 1102 and not expired as evaluated at step 1106, step 1108 is performed to determine whether the provider node data is in the dehydrated state. If dehydrated, the process returns to FIG. 10, step 1016.

If not in the dehydrated state at step 1108, step 1110 is evaluated to determine whether the data is in the hydrated state (as opposed to the partially hydrated state). If hydrated, step 1110 branches to step 1114; if partially hydrated, step 1112 represents parsing the data into the hydrated state; at this point, the data is cached, unexpired and hydrated.

When cached, unexpired and hydrated data is available, step 1114 adds the data to the batch response. Step 1116 marks the provider node ID in the map as having its data obtained for this requestor ID. The process then returns to FIG. 10, point B, which corresponds to step 1010 of FIG. 10.

Step 1010 of FIG. 10 evaluates whether the batch response is now complete based on the provider node data having been found in the cache. If so, step 1012 sends the batch response to the requestor to fulfill the promise, and step 1014 removes the requestor ID and its associated provider node ID(s) from the map.

If the batch response still needs more provider node data, or valid data was not found in the cache, step 1016 is performed along with step 1018 until each provider node ID in the batch request has been looked for the cache. Note that if the entire batch request can be satisfied with data from the cache, the steps of FIG. 12 are not performed for this request. Further, note that if a given cache may be scanned for multiple entries with a single batch request, then steps 1008, 1016 and 1018 that separately select and process each provider node ID against the cache are not needed for such a cache.

If the data of at least one provider node ID for this request has not been returned from the cache, the steps of FIG. 12 are performed to batch and/or multiplex each outstanding provider node data request to the data service. Note that multiplexing is described herein, however in alternative implementations multiplexing is optional; e.g., if the client software rarely has multiple requests for the same data in the same batching timeframe, then the client platform may be configured such that multiple requests for the same data are preferable to the overhead of multiplexing. The example steps of FIG. 12 include multiplexing concepts.

Step 1202 represents receiving the requestor ID at the multiplexing logic of the batch request manager. Step 1204 looks for the first unmarked provider node ID associated with the requestor ID received at step 1202, (where "marked" indicates the provider node data was in the cache, and "unmarked" refers to the need to obtain the data for the provider node ID from the data service).

Step 1206 is related to multiplexing, and checks whether a request for this provider node ID is already pending (e.g., from another request), by checking the set of pending requests 446 (FIG. 4). If not already pending, step 1208 adds the request for the provider node to the pending list, and step 1210 sends the request to the batching process where it is added to the (multiplexed) batch request buffer; this corresponds to blocks 454 and 456 of FIG. 4. If the batch request buffer becomes full as checked at step 1212, a new batch request buffer is started at step 1214. A full buffer may be sent as a batch request to the data service along with any other buffer or buffers at the appropriate time, e.g., once per rendering frame. An alternative option is to instead send a full buffer as soon as full, followed by as any other batch buffer at the appropriate sending time.

Step 1216 checks whether there is another provider node ID to be handled from this batch request from the requestor. If so, step 1218 selects the next requested provider node ID in the batch and returns to step 1206 to repeat the multiplexing (and batch adding) process until the (unmarked) batched set of received requests from the requestor have been handled.

Figure 13A:
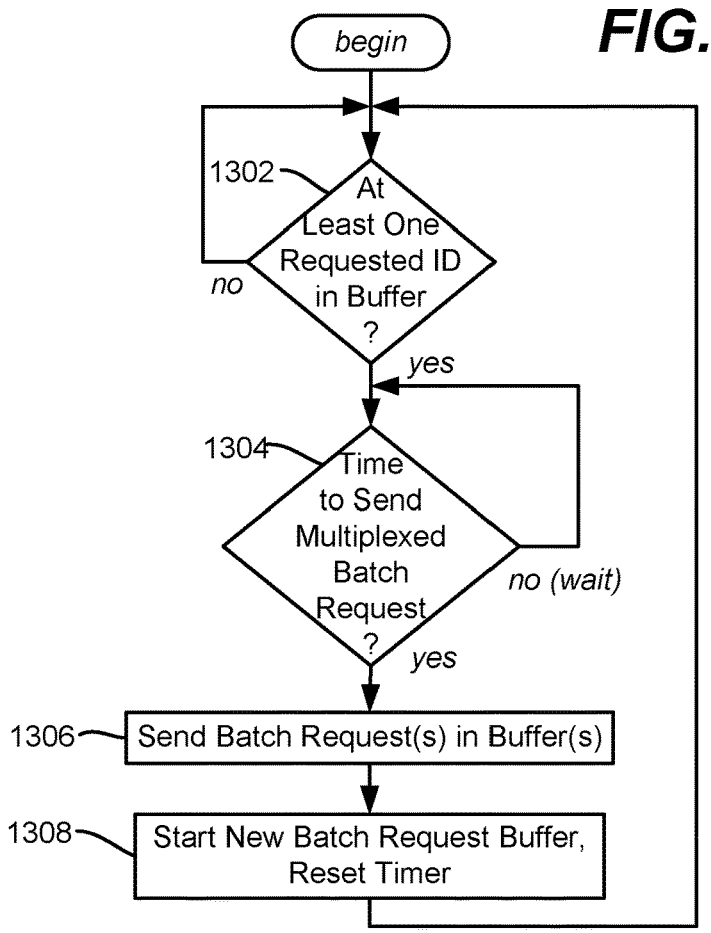
FIGS. 13A and 13B are flow diagrams showing alternatives of example logic/steps that may be taken to send batched data requests, according to one or more example implementations.
Figure 13B:
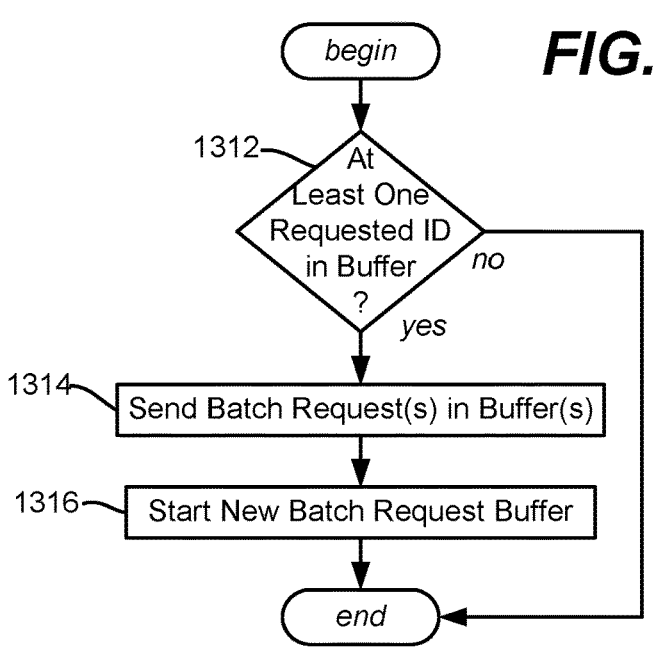

FIGS. 13A and 13B are flow diagrams showing example steps that may be taken to send the batch buffer in a batch request to the data service. Step 1302 checks whether there is at least one request in the buffer; if not, the process waits for one. Note that an alternative is to not invoke the logic of FIG. 13A unless the buffer has at least one request therein. Step 1304 represents delaying until it is time to send the batch request; it is understood that this is typically not a blocking operation, and that more requests may be being separately added to a buffer while waiting.

When time to send, step 1306 sends a batch request corresponding to each batch buffer; note that multiple buffers may need to be sent (unless a buffer is sent when it is filled, e.g., via the option at step 1214 of FIG. 12. Step 1308 starts a new batch request buffer, and step 1308 resets the timer for the next send time.

FIG. 13B is generally similar to FIG. 13A except that FIG. 13B is called/triggered when it is time to send a batch request buffer, and thus the timer/time evaluation is not needed in the steps of FIG. 13B. As can be appreciated, either the logic of FIG. 13A or FIG. 13B, as well as other alternatives, may be used in a given system.

If in FIG. 13B at least one request is in a buffer at step 1312, step 1314 sends the buffer, or multiple buffers if more than one needs to be sent. Step 1316 starts a new batch request buffer. Note that an alternative is to not trigger the logic of FIG. 13B unless the buffer has at least one request therein at the triggering time.

Once a buffer of one or more batched requests is sent, responses begin arriving to each request. In one implementation, as described herein, these responses need not be returned in a batch form (e.g., by the data service) but rather streamed to the batch request manager when each one or group of responses is ready, whereby each response may be de-multiplexed. Note that some responses may be from a data cache of the data service, while others may be obtained by calls to a physical data backing store or stores, whereby the response times may be quite different. Further note that even though the responses are basically considered separately streamed responses at the batch request manager, the batch request manager may combine the de-multiplexed responses into a batch response to match any batch request from any requestor.

Figure 14:
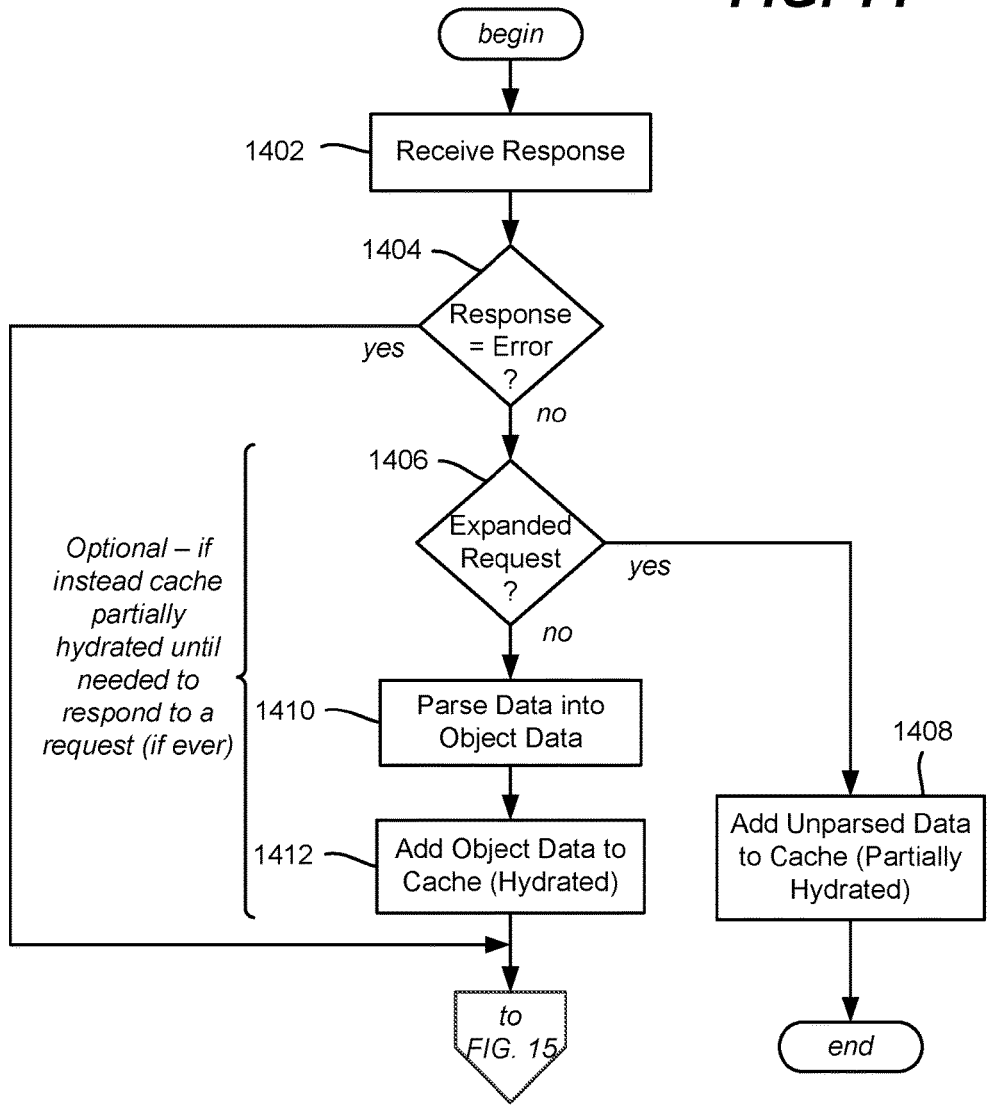
FIGS. 14-16 comprise a flow diagram showing example logic/steps that may be performed to handle a response received at a client component with respect to a request sent in a multiplexed, batched request set, according to one or more example implementations.
Figure 15:
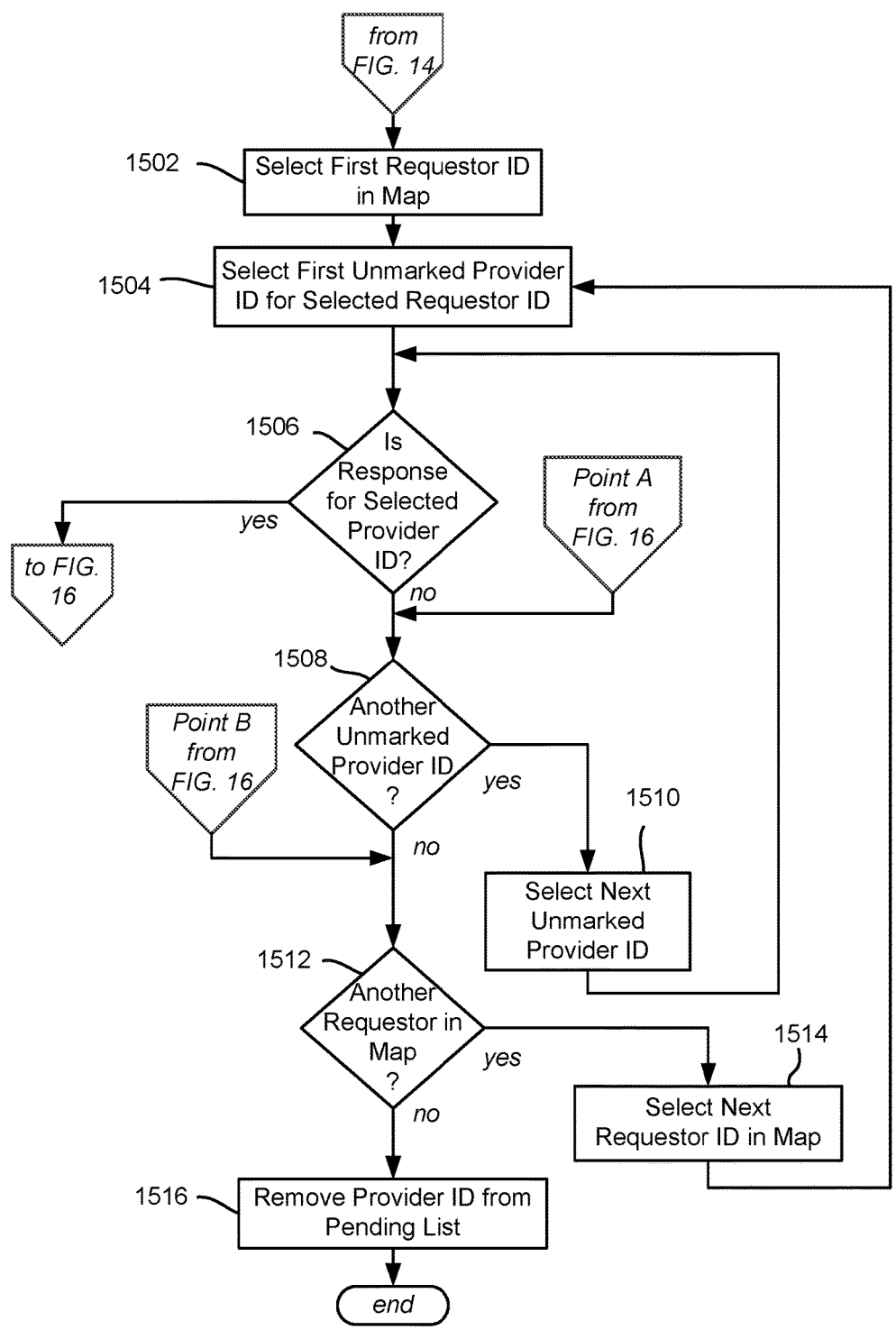
Figure 16:
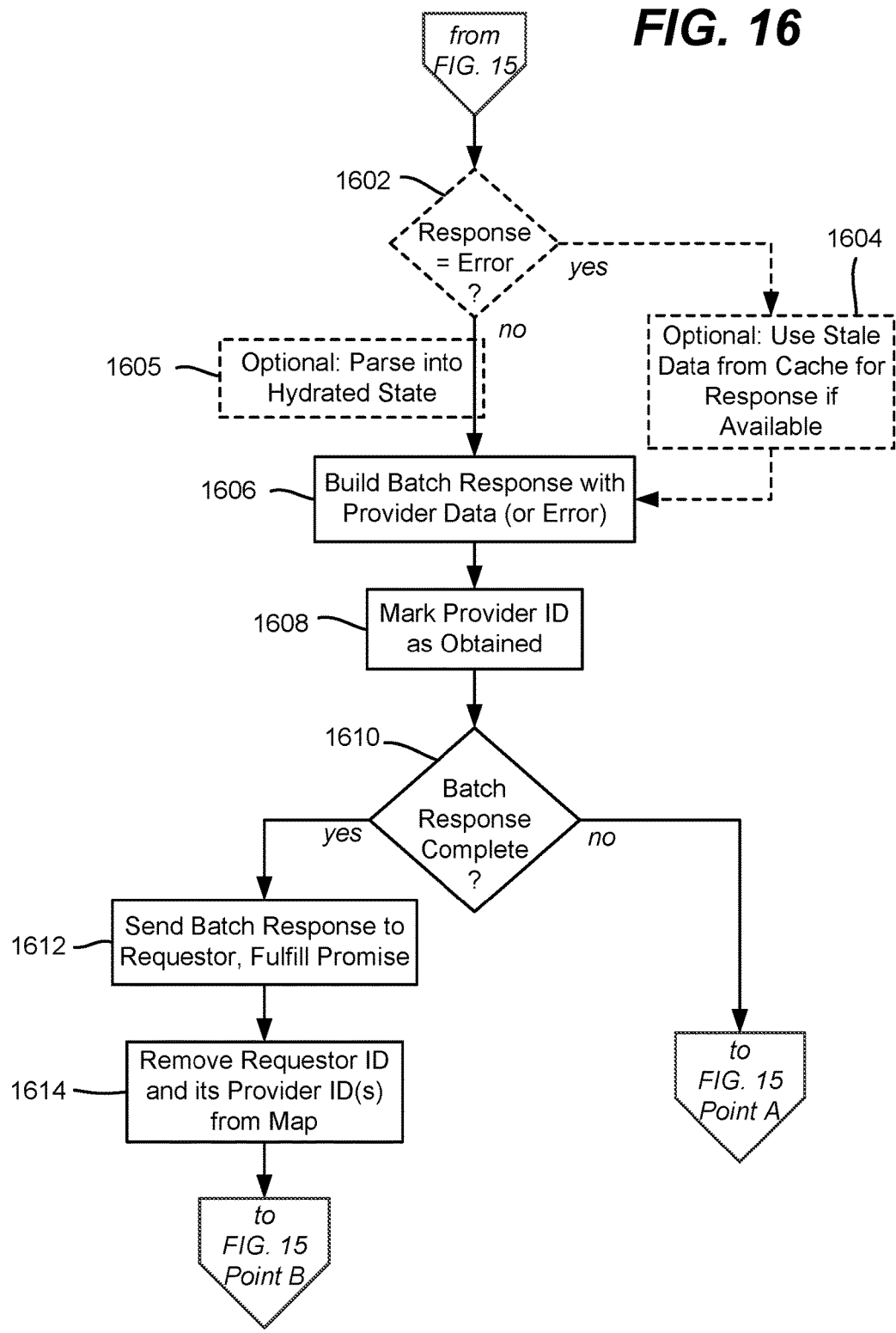

FIGS. 14-16 comprise a flow diagram showing example steps that may be taken when a response to a batched, multiplexed request is received, e.g., from the data service. Note that with respect to when a requestor receives a response, FIGS. 14-16 are based on an implementation in which a batch response is returned to the requestor only when each of that requestor's requested batch requests have received a response (which may include a timeout or other error response). Thus, a batch response is built from each of the separate responses for the corresponding requests before being returned as a single batch response to a requestor. Note that it is alternatively feasible to return individual responses to a requestor's batch request instead of waiting for each response; similarly batch response subsets (that may include more than one response but not all responses) may be returned instead of waiting for a complete batch response to be assembled before returning.

Step 1404 of FIG. 14 evaluates whether the response was an error message. If so the response is still handled as described herein with respect to FIG. 15, but there is no provider node data to cache.

If there is valid data (not an error), step 1406 evaluates whether the response was to an expanded request made by the data service as opposed to a requestor-initiated request (e.g., as flagged in the response). If an expanded request, the data is cached in its (unparsed) partially hydrated state at step 1408, and the response handling process ends for this response. Note that steps 1404 and 1406 assume that a data service-initiated expanded request does not have an error message returned to a client. If a response to a requestor-initiated request, then step 1410 parses of the data into the hydrated object model data that the client platform can use. Step 1412 adds the object data to the client cache.

One alternative to FIG. 14, steps 1406, 1410 and 1412 is to always cache newly received provider node data in its partially hydrated state. Then, when processing the response against outstanding request(s) for this provider node's data, parse the data into the hydrated state if needed by any requestor. One advantage to this option is not having to flag or otherwise differentiate expanded requests/responses at the data service from those that were actually requested; however a disadvantage is that an expanded request/response (that appears otherwise the same as an actual request/response) that was not actually requested by any requestor needs to be evaluated against outstanding requestor requests to see if it was actually requested by any requestor (but in fact was not).

For hydrated data (and error responses), the steps of FIG. 15 are performed to de-multiplex the response for returning to each associated requestor. FIG. 15 also builds up a batch response to each requestor's batch request (as needed) until completed, at which time the completed batch response is returned. A request for a single provider node is handled in the same way, e.g., as if there was a batch request that contained only a single provider node ID.

In general, the steps of FIG. 15 walk through the requestor ID-to-provider node ID map attempting to match the provider node ID in the currently received response back to each provider node's batch request, that is, including to de-multiplex any responses to previously multiplexed requests. To this end, step 1502 selects the first requestor ID-to-requested provider node ID(s) mapping in the map. Step 904 selects the first "unmarked" provider node ID for this requestor ID, that is, the first request ID that has not been marked as already having received a response for it.

Step 1506 evaluates whether the response is for the selected requestor ID. If so, the process continues to FIG. 16 as described below. If not, step 1508 looks for another unmarked provider node ID (if any) in the batch request for this requestor ID, and if there is another such request ID, step 1510 selects this next provider node ID to look for a match with the response.

Steps 1512 and 1514 advance the process for each other requestor ID in the requestor ID-to-provider node ID(s) map. When no requestor ID having a provider node ID remains to be compared, step 1516 removes the provider node ID from the pending list. Note that for an expanded response, no provider node ID may be in the pending list. Further note that step 1516 may occur at the end of processing the response so that in implementations in which new requestor batch requests can be added to the requestor ID-to-provider node ID map, e.g., while the response is being processed against the earlier requestor batch requests, another request for the same data is not sent if it corresponds to this response.

When the response matches the selected requestor ID and provider node ID at step 1506, FIG. 16 is performed, generally to determine whether all requests in the batch request have received responses. If so, a batch response is returned to the requestor with a full set of batched responses to the batch request. Note that alternative implementations may send a response to a corresponding requestor as each response is received rather than batch the responses to match a requestor's batch request.

To process a response, step 1602 of FIG. 16 represents optionally determining whether the response was an error response. If so, the response will be returned as an error, although in one or more implementations it is an option to use stale data from the cache (step 1304) if such data is available rather than sending an error. Note that it is feasible to consider an entire batch response to be an error if any one provider node request had an error returned for it; however it is also feasible to return a combination of valid provider node data and error data in batch response; (the example of FIG. 16 uses this latter alternative).

If not an error, step 1606 begins or continues to build the batch response based upon the currently received response. In general, this may be performed at step 1608 by marking the requestor's provider node ID as received/handled; a pointer to the response data, e.g., maintained in a suitable data structure (possibly the cache), may be used to reference this response's data. It should be noted that as described above with reference to FIG. 14, steps 1406, 1410 and 1412, an option is to cache newly received response data into the cache in the partially hydrated state, without parsing until needed; if this option is implemented, then a parsing/hydrating operation (step 1605) may be performed between step 1602 and 1606 (for partially hydrated, non-error responses) that need to be parsed into the object (hydrated state) form.

Step 1610 evaluates whether the batch response is complete based upon this current response having been received, that is, no provider node ID remains unmarked for this requestor ID. If not, step 1610 returns to FIG. 15 at entry point A (corresponding to step 1508) to evaluate whether the response also matches another provider node ID in the batch request. Note that a batch request ordinarily should not contain a request for the same data more than once, and if this can be guaranteed, then step 1610 can instead return to FIG. 15 at entry point B (corresponding to step 1512). Otherwise a batch request containing the same requested provider node ID more than once (e.g., A, B, A, D) may result in a batch request that never has a response thereto returned, because the replicated request ID may never be evaluated and thus may remain unmarked.

If the batch response is complete at step 1610, step 1612 sends the batch response's data back to the client requestor and step 1614 removes the requestor ID and its mapped-to requested provider node ID(s) from the map. Step 1614 returns to FIG. 15 at entry point B (corresponding to step 1512). As described above, at step 1512 the process looks for whether there is another requestor ID with one or more provider node requests to match against the current response; if so, the process repeats matching the current response against the next requestor's provider node IDs, until no requestor IDs along with their provider node IDs remain to be evaluated for this response.

It should be noted that because a response containing provider node data is cached, further requests for the same provider node will be returned from the cache, at least until expired or otherwise removed from the cache. However, in the event that cache updating is relatively slow, such that the cache cannot be updated before another request for the same provider node comes in, then it is feasible to delay removing the request ID from the pending list while also leaving the response in its response data structure for a while. In this way, if another request for that same data comes in, (because the cache had not yet been updated), another request will not be sent (because the request ID is still in the pending request ID list), with the request instead able to be satisfied from the response data structure via straightforward detection logic, e.g., by maintaining a delayed removal list and matching incoming requests against this list.

Figure 17:
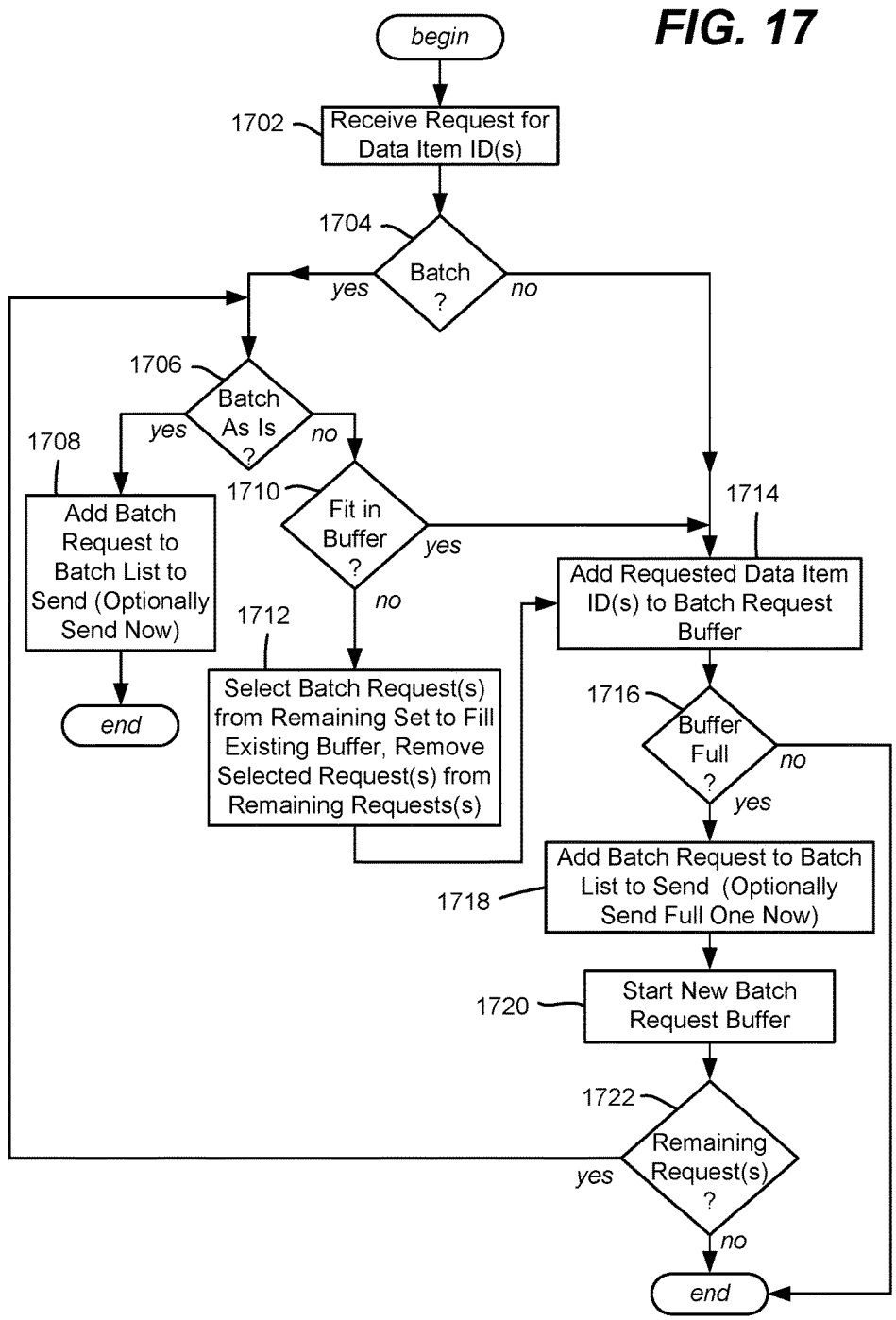
FIG. 17 is a flow diagram showing example logic/steps that may be taken to batch client requests for data items, according to one or more example implementations.

FIG. 17 is a flow diagram showing example steps that may be taken when batching is in use at a particular request-response level, but not multiplexing, at least at that level; (e.g., because the overhead is not worth the savings from multiplexing at that level). In general, the above logic applies with respect to requesting data items and returning responses, except that multiplexing operations may be bypassed, and some additional considerations may be handled, as exemplified in the steps of FIG. 17.

Step 1702 represents receiving a request from a requestor, e.g., a client requestor, which may be a batch request or a get request for a single item, as evaluated at step 1704. If a single item get request, step 1704 branches to step 1714, which adds the single requested provider ID to the batch request buffer, step 1716 evaluates whether the batch buffer is full, and if so, step 1718 adds the batch buffer to a list of batch buffer(s) to send (or optionally sends it now) and step 1720 starts a new batch buffer.

If the buffer is not full at step 1716, the batching process ends as this single get request has been handled. Alternatively, if the buffer was full at step 1716 but only a single data item get request was received at step 1702, then step 1722 also ends the batching process ends as this single get request has been handled and no items remain to buffer for this request.

Returning to step 1704, if a batch request is received for processing, step 1706 is performed. Step 1706 is an optional step that evaluates whether the batch request is to be sent as is. For example, consider that the batch request contains the same number of requests as the batch buffer limit; if so, it may be more efficient to simply send the batch request generally as is via step 1708 (after any processing as needed for forwarding as a batch buffer), rather than process it further to (possibly) break it up into separate buffers; (if multiplexing is not being performed, then it does not matter if a data item of the batch request is already pending). Similarly, even if not the same as the limit, the number of requests may be close enough, e.g., if the limit is thirty-two requests in a batch buffer, a threshold such as twenty-nine requests may be sufficient to leave the batch request (generally) as is with respect to sending the batch request to the recipient data-providing entity at step 1708. Such a batch request is handled once the batch request is added to the list of batch buffer request(s) (or is optionally sent now).

If the request is not to be sent as is as determined via step 1706 (or such an option is not provided in a given implementation), step 1710 evaluates whether the batch request will fit in the existing batch buffer. For example, if the existing batch buffer has twenty-five items out of a limit of thirty-two, then a batch request having more than seven items may be split into two or more parts. If the batch request's items fit into the buffer, then step 1710 branches to step 1714 to add the items as generally described above with respect to a single item. Otherwise step 1712 selects the number that will fit, and branches to step 1714 to add the selected items as generally described above with respect to a single item. Because the buffer is filled by steps 1712 and 1714, steps 1718, 1720 and 1722 are performed; those items that remain are handled by having step 1722 return to step 1706. As can be readily appreciated by following the logic/steps of FIG. 17, any practical number of items received in a batch request at step 1702 may be handled by dividing them up if needed to comply with a batch buffer limit, and sending as many batch buffers as used, e.g., at the appropriate timeframe (and optionally as soon as any given buffer is full).

As can be seen, described herein is a technology that allows a client request manager to batch requests for data items to a data service. The data service may obtain these data items in various ways (e.g., from data service caches and/or backing data sources), and may assemble/build a batch response by maintaining mappings of client devices/requestors to client request data item ID(s). Along with batching, multiplexing to combine requests for the same data item may be used to reduce the number of data items requested, with de-multiplexing re-associating responses to their requestors. Batching and/or multiplexing may be used at various request-response levels from any requesting entity to any data-providing entity.

One or more aspects are directed towards receiving a first batch request for identified data items from a requesting entity, in which each requested data item is identified by an identifier, and adding the identifier of an identified data item from the first batch request to a batch buffer. Described herein is determining a sending time for sending the batch buffer, and at the sending time, sending the batch buffer as a buffered request to a data-providing entity. Aspects include receiving one or more responses to the buffered request from the data-providing entity, in which the one or more responses each include response information comprising data or an error for each identifier of a data item that was added to the batch buffer. Described herein is returning a complete batch response to the first batch request, in which the complete response contains response information for each data item identified in the first batch request, including building the complete batch response to the first batch request by adding response information from the one or more responses from the data-providing entity to the first batch response until the complete batch response contains response information corresponding to each data item identified in the batch request.

Adding the identifier of the identified data item from the first batch request to the batch buffer may include determining that another request for the data item having that identifier is not already pending. The identifier may be added to a pending set.

The identifier of another identified data item may be added from the first batch request to the batch buffer. Determining the sending time for sending the batch buffer may include determining when a time frame is reached.

Upon determining that the batch buffer is full, a new batch buffer may be started. The identifier of another identified data item in the first batch request may be added to the new batch buffer. A sending time for sending the new batch buffer may be determined, and the new batch buffer sent at the sending time as another buffered request to the data-providing entity Further described herein is determining that the identifier of another identified data item in the first batch request is already pending via another request to the data-providing entity; building the complete batch response to the first batch request may include adding response information from a response to the other request from the data-providing entity Receiving the first batch request may include receiving at least the identifier of an identified data item and the identifier of another identified data item; building the complete response may include adding data from a cache entry corresponding to the identifier of the other identified data item.

One or more aspects are directed towards a request handling entity that receives requests for data from requesting entities, in which at least some of the requests for the data each identify one or more data items via a corresponding data identifier for each data item. A request manager of the request handling entity includes a request batcher that that adds identifiers of requested data items to a batch buffer and sends the batch buffer to a data-providing entity, and a response handling component that returns responses to the requesting entities, each response containing response information for each data item that is identified via an identifier in a corresponding request.

A request from a request handling entity may be a batch request, and the data-providing entity may stream at least two partial responses to the batch request. The response handling component may build a batch response to the batch request by including response information from each partial response.

The requesting entities may be client objects, and the request handling entity may comprise the request manager of a client data access layer. The data-providing entity may be a client-interfacing data service.

A request multiplexer may be coupled to the request manager, in which the request multiplexer combines a plurality of requests for a same data item from a plurality of requesting entities into a single request to the data-providing entity. A response de-multiplexer may process a single response to the single request into a plurality of responses to provide a response to each requesting entity.

The request batcher may start a new batch buffer when the batch buffer is full. The request batcher may send the batch buffer and the new batch buffer to the data-providing entity when a time frame is reached. The request batcher also may start a new batch buffer when the batch buffer is sent to the data providing entity.

One or more aspects are directed towards receiving a first request for a first data item from a first requestor, maintaining first mapping data including associating the first requestor with the first data item, receiving a second request for a second first data item from a second requestor and maintaining second mapping data including associating the second requestor with the second data item. A batch request is sent to a data-providing entity that includes a plurality of requests, including requests corresponding to the first request and the second request. Response information is received from the data-providing entity in response to the batch request, including first response information corresponding to the first data item and second response information corresponding to the second data item. The first mapping data is accessed to return a first response corresponding to the first response information to the first requestor, and the second mapping data is accessed to return a second response corresponding to the second response information to the second requestor.

The first request for the first data item may be part of a batch request that further includes a request for another data item. Accessing the first mapping data to return the first response corresponding to the first response information to the first requestor may be accomplished by including the first response as part of a batch response to the first requestor.

The second request for the second first data item may be a multiple data item request that includes a request for the second data item and a request for the first data item. Maintaining the second mapping data may include associating the second requestor with the first data item. Sending the batch request may include having only one request for the first data item in the batch request; accessing the second mapping data to return a second response comprises returning a response to the multiple data item that includes the first response information and the second response information to the second requestor.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 18 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 18:
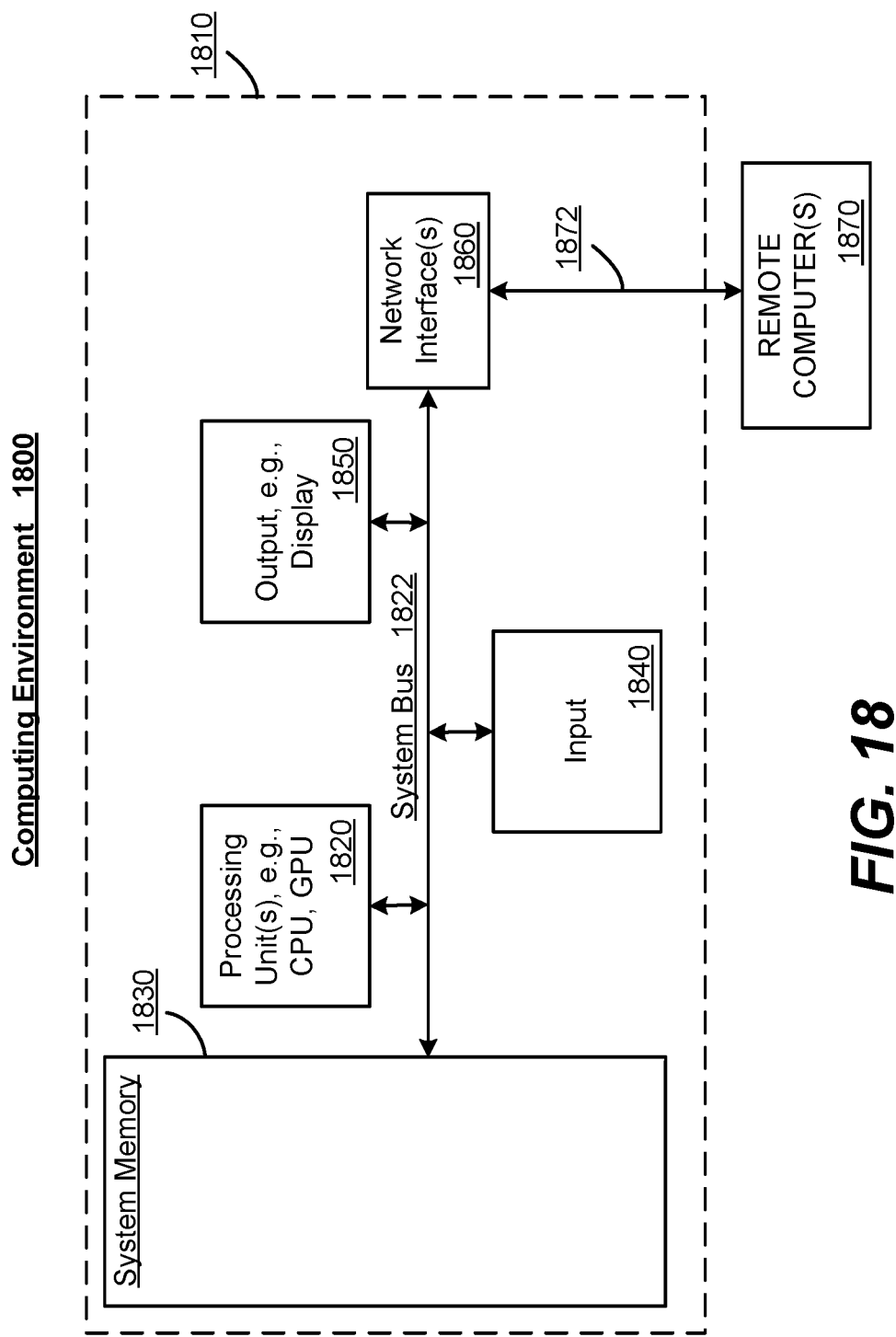
FIG. 18 is a block diagram representing an example computing environment into which aspects of the subject matter described herein may be incorporated.

FIG. 18 thus illustrates an example of a suitable computing system environment 1800 in which one or aspects of the implementations described herein can be implemented, although as made clear above, the computing system environment 1800 is only one example of a suitable computing environment and is not intended to suggest any limitation as to scope of use or functionality. In addition, the computing system environment 1800 is not intended to be interpreted as having any dependency relating to any one or combination of components illustrated in the example computing system environment 1800.

With reference to FIG. 18, an example device for implementing one or more implementations includes a general purpose computing device in the form of a computer 1810. Components of computer 1810 may include, but are not limited to, a processing unit 1820, a system memory 1830, and a system bus 1822 that couples various system components including the system memory to the processing unit 1820.

Computer 1810 typically includes a variety of machine (e.g., computer) readable media and can be any available media that can be accessed by a machine such as the computer 1810. The system memory 1830 may include computer storage media in the form of volatile and/or nonvolatile memory such as read only memory (ROM) and/or random access memory (RAM), and hard drive media, optical storage media, flash media, and so forth. By way of example, and not limitation, system memory 1830 may also include an operating system, application programs, other program modules, and program data.

A user can enter commands and information into the computer 1810 through one or more input devices 1840. A monitor or other type of display device is also connected to the system bus 1822 via an interface, such as output interface 1850. In addition to a monitor, computers can also include other peripheral output devices such as speakers and a printer, which may be connected through output interface 1850.

The computer 1810 may operate in a networked or distributed environment using logical connections to one or more other remote computers, such as remote computer 1870. The remote computer 1870 may be a personal computer, a server, a router, a network PC, a peer device or other common network node, or any other emote media consumption or transmission device, and may include any or all of the elements described above relative to the computer 1810. The logical connections depicted in FIG. 18 include a network 1872, such as a local area network (LAN) or a wide area network (WAN), but may also include other networks/buses. Such networking environments are commonplace in homes, offices, enterprise-wide computer networks, intranets and the internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. One or more non-transitory machine-readable storage media having machine-executable instructions, which when executed perform operations, the operations comprising:
   receiving a first request for a first data item from a first requestor;
   maintaining first mapping data including associating the first requestor with the first data item;
   receiving a second request for a second data item from a second requestor;
   maintaining second mapping data including associating the second requestor with the second data item;

sending a batch request that includes a plurality of requests to a data-providing entity, the batch request including requests corresponding to the first request and the second request;

receiving response information from the data-providing entity in response to the batch request, including first response information corresponding to the first data item and second response information corresponding to the second data item;

accessing the first mapping data to return a first response corresponding to the first response information to the first requestor;

accessing the second mapping data to return a second response corresponding to the second response information to the second requester; and wherein the first request for the first data item is part of a multiple data item request that further includes a request for another data item, and wherein the accessing the first mapping data to return the first response corresponding to the first response information to the first requestor comprises including the first response as part of a batch response to the first requestor.

2. The one or more non-transitory machine-readable storage media of claim 1, wherein the multiple data item request is a first multiple data item request and wherein the second request for the second data item comprises a second multiple data item request that includes a request for the second data item and a request for the first data item, wherein maintaining the second mapping data further includes associating the second requestor with the first data item, wherein sending the batch request includes having only one request for the first data item in the batch request, and wherein the accessing the second mapping data to return the second response comprises returning a response to the second multiple data item request that includes at least part of the first response information and the second response information to the second requestor.

3. The one or more non-transitory machine-readable storage media of claim 1, wherein the operations further comprise determining whether another request for the first data item is already pending, and in response to determining that another request for the first data item is not already pending, adding an identifier of the first data item to a batch buffer, and in response to determining that another request for the first data item is already pending, not adding an identifier of the first data item to a batch buffer.

4. A method, comprising:

receiving a first request for a first data item from a first requestor;

maintaining first mapping data, including associating the first requestor with the first data item;

receiving a second request for a second data item from a second requestor, wherein the second request comprises a multiple data item request that includes a request for the second data item and a request for the first data item;

maintaining second mapping data including associating the second requestor with the second data item and associating the second requestor with the first data item;

sending a batch request comprising a plurality of requests to a data-providing entity, the batch request comprising requests corresponding to the first request and the second request, and wherein the batch request comprises only one request for the first data item;

receiving response information from the data-providing entity in response to the batch request, including first response information corresponding to the first data item and second response information corresponding to the second data item;

accessing the first mapping data to return a first response corresponding to the first response information to the first requestor; and accessing the second mapping data to return a second response to the multiple data item request that corresponds to the second response information to the second requestor, comprising returning the second response that includes the first response information and the second response information to the second requestor.

5. The method of claim 4, wherein the first request for the first data item is part of another multiple data item request that further includes a request for another data item, and wherein accessing the first mapping data to return the first response corresponding to the first response information to the first requestor comprises including the first response as part of a batch response to the first requestor.

6. The method of claim 4, further comprising determining that another request for the first data item is not already pending, and in response to the determining, adding an identifier of the first data item to a batch buffer.

7. The method of claim 6, further comprising determining a sending time for sending the batch buffer based on determining when a time frame is reached.

8. The method of claim 6, further comprising, determining that the batch buffer is full, and starting a new batch buffer.

9. The method of claim 8, further comprising, adding an identifier of another identified data item to the new batch buffer.

10. The method of claim 4, further comprising adding an identifier of the first data item to a pending set.

11. The method of claim 4, further comprising determining that another request for the first data item is already pending, and in response to the determining, not adding an identifier of the first data item to a batch buffer.

12. A system, comprising:

a processor; and a memory that stores executable instructions that, when executed by the processor, facilitate performance of operations, the operations comprising:

receiving a first request from a first requestor, the first request comprising a multiple data item request requesting at least one data item and another data item;

maintaining first mapping data, comprising associating the first requestor with the at least one data item and the other data item;

receiving a second request for a second data item from a second requestor;

maintaining second mapping data, comprising associating the second requestor with the second data item;

sending a batch request comprising a plurality of requests to a data-providing entity, the batch request comprising requests corresponding to the first request and the second request;

receiving response information from the data-providing entity in response to the batch request, including first response information corresponding to the first request and second response information corresponding to the second request;

accessing the first mapping data to return a first response as a batch response corresponding to the first response information to the first requestor; and accessing the second mapping data to return a second response to the multiple data item request corresponding to the second response information to the second requestor.

13. The system of claim 12, wherein the operations further comprise combining a plurality of requests for a same data item from the first requestor and the second requestor into a single request to the data-providing entity.

14. The system of claim 12, wherein the first request for the first data item is part of another multiple data item request that further includes a request for another data item, and wherein accessing the first mapping data to return the first response corresponding to the first response information to the first requestor comprises including the first response as part of a batch response to the first requestor.

15. The system of claim 12, wherein the operations further comprise determining that another request for the first data item is not already pending, and in response to the determining, adding an identifier of the first data item to a batch buffer.

16. The system of claim 12, wherein the operations further comprise determining a sending time for sending the batch buffer based on determining when a time frame is reached.

17. The system of claim 12, wherein the operations further comprise determining that the batch buffer is full, and starting a new batch buffer.

18. The system of claim 12, wherein the operations further comprise adding an identifier of another identified data item to the new batch buffer.

19. The system of claim 12, wherein the operations further comprise adding an identifier of the first data item to a pending set.

20. The system of claim 12, wherein the operations further comprise determining that another request for the first data item is already pending, and in response to the determining, not adding an identifier of the first data item to a batch buffer.

* * * * *